(12) United States Patent
Flynn, Sr. et al.

(10) Patent No.: US 6,625,509 B1
(45) Date of Patent: Sep. 23, 2003

(54) AUTOMATED MULTISECTION RAIL MATERIAL LIST GENERATION SYSTEM AND METHOD

(75) Inventors: Roger Lee Flynn, Sr., Owings, MD (US); Robert Henkel, Apex, NC (US)

(73) Assignee: R & F Industries, LLC, Clinton, MD (US)

(*) Notice: Subject to any disclaimer, the term of this patent is extended or adjusted under 35 U.S.C. 154(b) by 0 days.

(21) Appl. No.: 09/517,819

(22) Filed: Mar. 2, 2000

Related U.S. Application Data
(60) Provisional application No. 60/122,957, filed on Mar. 5, 1999.

(51) Int. Cl.[7] .............................................. G06F 17/60
(52) U.S. Cl. ........................................ 700/106; 700/97
(58) Field of Search ........................... 700/106, 95, 97, 700/98, 164, 159; 345/419; 703/1

(56) References Cited

U.S. PATENT DOCUMENTS

| | | | | |
|---|---|---|---|---|
| 5,442,735 A | * | 8/1995 | Paradine | 345/179 |
| 5,495,568 A | * | 2/1996 | Beavin | 345/419 |
| 5,629,981 A | * | 5/1997 | Nerlikar | 340/10.31 |
| 5,697,829 A | * | 12/1997 | Chainani et al. | 446/436 |
| 5,754,660 A | | 5/1998 | Shimizu | |
| 5,859,926 A | | 1/1999 | Asahi et al. | |
| 5,923,678 A | | 7/1999 | Ishibashi | |
| 5,978,593 A | * | 11/1999 | Sexton | 710/1 |
| 6,343,285 B1 | * | 1/2002 | Tanaka et al. | 700/106 |

FOREIGN PATENT DOCUMENTS

| | | |
|---|---|---|
| EP | 0 898 277 | 2/1999 |
| EP | 0 926 628 | 6/1999 |

OTHER PUBLICATIONS

User's Guide, Materializer, Version 1.0 for Windows, Win-Born Technologies.*

* cited by examiner

Primary Examiner—Leo Picard
Assistant Examiner—Alexander Kosowski
(74) Attorney, Agent, or Firm—Fish & Richardson P.C.

(57) ABSTRACT

An automated multisection rail material list generation system and method for: receiving dimensional data concerning a multisection rail having a top rail and a bottom rail; determining the dimensions of the physical rail elements required to produce the multisection rail; allowing the user to define a transition radius at any transition point between adjacent rail sections; and producing a material list itemizing the physical rail elements and their dimensions required to produce the multisection rail.

30 Claims, 5 Drawing Sheets

AUTOMATED MULTISECTION RAIL MATERIAL LIST GENERATION SYSTEM AND METHOD

RELATED APPLICATIONS

This application claims priority of U.S. Provisional Application No. 60/122,957 filed Mar. 5, 1999.

FIELD OF INVENTION

This invention relates to an automated multisection rail material list generation system and method and, more particularly, to such a system and method which automatically produces a material list which itemizes the discrete dimensioned elements required to produce each section of the multisection rail.

BACKGROUND OF INVENTION

The design and construction of a railing for use on a staircase can be a complex job, especially when the staircase is anything other than a simple design. On complex staircases that incorporate one or more landings and numerous stair sections, the design and construction of these railings can be quite tedious and time consuming.

Typical railings used on staircases, guardrails or for fences incorporate various components. Posts are used to anchor the sections of railing in the ground, where each rail section is constructed of a top rail, a bottom rail and numerous pickets connecting the rails together. Additionally, decorative items such as rings and scrolls may be incorporated into the rail section for aesthetic purposes. Further, additional top rails or bottom rails may be incorporated to add strength and aesthetic appeal.

Traditionally, rail sections were laid out by hand, where lengths of steel or wrought iron were cut to approximate length and hand trimmed or ground until they fit properly. As can be imagined, this is a very time consuming process that often resulted in a substantial amount of waste due to miscut parts. In order to avoid cutting parts too short, they were often intentionally cut too long so that they could be trimmed to fit, which resulted in further waste.

In an effort to simplify rail design, computer programs were generated which attempted to automate the design process. Specifically, the user would input the length of the section of rail into the program and, in turn, the program would calculate the number of pickets, the picket length, the picket spacing, etc. However, these programs failed to address the truly complex issues concerning rail design and manufacturing, namely the problems encountered when designing a complex multisection rail system.

Anytime a stairway incorporates a landing, at least two sections of railing have to be joined together to make the railing for that stairway. Since safety regulations can require different overall heights for the railing used on a landing versus the railing used on a stair (or rake or bevel) section, numerous problems are encountered when these two sections of varying height railing are joined together. Typically, a landing rail section has an overall height of 36 inches, while a stair rail section has an overall height of 34 inches. Simply abutting these two sections together at a post will result in a two inch deviation of overall height between the landing side and the stair side.

In order to alleviate this problem, the transition point between these two rail sections can be shifted towards the stair rail (in the event of an inclining stair section) so that the landing will continue horizontally until it intersects the stair rail. Alternatively, the transition point can be shifted away from the stair rail (in the event of a declining stair section). Calculating the amount of the offset for this transition point is further complicated by the angle of the stair section. Additionally, any setback of the post in relation to the true intersection of the landing and the stair section will result in a railing in which the rail height of the stair section is too low. Therefore, if the post of a railing is set back in relation to this intersection, the post height must be increased or decreased accordingly to maintain the proper height of the stair section railing. Additional complications in multisection rail design include the fact that as the angle of the stair section increases, the horizontal spacing of the pickets in that section will decrease, as the picket spacing varies in accordance with the cosine of the angle of incline of the stair.

BRIEF SUMMARY OF THE INVENTION

It is therefore an object of this invention to provide an automated multisection rail material list generation system and method which automates the design process for multisection rails.

It is a further object of this invention to provide such a system and method which minimizes material waste and maximizes design efficiency.

It is a further object of this invention to provide such a system and method which automatically calculates the required transition offset when joining rail sections of varying height.

It is a further object of this invention to provide such a system and method which automatically calculates the required post height in relation to post set back and rail height.

It is a further object of this invention to provide such a system and method which automatically calculates the required picket spacing in relation to the angle of incline of the stair selection.

This invention results from the realization that a truly effective automated multisection rail material list generation system and method can be achieved by receiving dimensional data concerning a multisection rail and utilizing that data to generate a material list which itemizes the individual dimensioned components required to assemble that multisection rail.

This invention features an automated multisection rail material list generation system including: a data importer for receiving dimensional data concerning each section of a multisection rail; a rail calculator, responsive to the data importer receiving the dimensional data, for determining the dimensions of the physical rail elements required to produce each section of the multisection rail; and a material list generator, responsive to the rail calculator, for producing a material list itemizing the physical rail elements and their dimensions required to produce each section of the multisection rail.

In a preferred embodiment, the dimensional data may describe a multisection rail in which each section of the multisection rail is at a different angle in relation to the horizon. The data importer may include a data interface for connecting the data importer to a network. The network may be the Internet. The network may be a telephone network. The material list generator may include a data exporter for providing the material list, which includes the physical rail elements, to an automated cutting station for producing a plurality of dimensioned components. The data exporter may provide the material list, which includes the physical rail elements, to an automated assembly station for assembling the plurality of dimensioned components into the multisection rail. The data exporter may include a graphical interpreter for producing a graphical diagram showing the physical rail elements arranged to form the multisection rail. The dimensional data may describe a multisection rail in which each section of the multisection rail includes a top rail and a bottom rail. The rail calculator may include a transition manager for allowing the user to define a transition radius at any transition point between adjacent rail sections. The transition manager may include a material elasticity compensator for compensating for any change in length of any the rail bent around the transition radius. The rail calculator may include an upper transition offset calculator for determining the offset of an upper transition point between each top rail of each rail section in relation to the point of contact between the sections. The rail calculator may include a lower transition offset calculator for determining the offset of a lower transition point between each bottom rail of each rail section in relation to the point of contact between the sections. The dimensional data may describe a multisection rail that includes at least one post. The rail calculator may include a post height calculator to determine the required height for a post in relation to post offset and specific design criteria. The dimensional data may describe a multisection rail in which each section of multisection rail includes a plurality of pickets. The rail calculator may include a picket spacer for analyzing the distance between adjacent posts to determine the required spacing between each of the plurality of pickets in response to specific design criteria. The rail calculator may include a dot line generator for calculating a linear measurement between any two points on the multisection rail.

This invention also features an automated multisection rail material list generation system including: a data importer for receiving dimensional data concerning each section of a multisection rail; a rail calculator, responsive to the data importer receiving the dimensional data, for determining the dimensions of the physical rail elements required to produce each section of the multisection rail; a material list generator, responsive to the rail calculator, for producing a material list itemizing the physical rail elements and their dimensions required to produce each section of the multisection rail; and a dot line generator for calculating a linear measurement between any two points on the multisection rail.

This invention also features an automated multisection rail material list generation system including: a data importer for receiving dimensional data concerning each section of a multisection rail; a rail calculator, responsive to the data importer receiving the dimensional data, for determining the dimensions of the physical rail elements required to produce each section of the multisection rail; and a material list generator, responsive to the rail calculator, for producing a material list itemizing the physical rail elements required to produce the multisection rail; wherein the dimensional data describes a multisection rail in which each section of the multisection rail includes a top rail and a bottom rail and the rail calculator includes a transition manager; the rail calculator including an upper transition offset calculator, responsive to the transition manager, for determining the offset of an upper transition point between each top rail of each section in relation to the point of contact between the sections.

This invention also features a method for generating a material list for a multisection rail including the steps of: receiving dimensional data concerning each section of a multisection rail; determining the dimensions of the physical rail elements required to produce each section of the multisection rail; and producing a material list itemizing the physical rail elements and their dimensions required to produce each section of the multisection rail.

In a preferred embodiment, the method for generating a material list may include the step of connecting the data importer to a network. The method for generating a material list may include the step of producing a graphical diagram showing the physical rail elements arranged to form the multisection rail. The method for generating a material list may include the step of determining the offset of an upper transition point between the top rail of each rail section in relation to the point of contact between the rail sections. The method for generating a material list may include the step of determining the offset of a lower transition point between the bottom rail of each rail section in relation to the point of contact between the rail sections. The method for generating a material list may include the step of calculating the required post height in relation to the post offset and specific design criteria. The method for generating a material list may include the step of analyzing the distance between adjacent posts to determine the required spacing between each picket utilized in each section of the multisection rail. The method for generating a material list may include the step of calculating a linear measurement between any two points on the multisection rail.

This invention also features a processor and memory configured to perform the steps of: receiving dimensional data concerning a multisection rail; determining the dimensions of the physical rail elements required to produce the multisection rail; and producing a material list itemizing the physical rail elements required to produce the multisection rail.

In a preferred embodiment, the processor and memory may be incorporated into a personal computer, a programmable logic controller, a single board computer, or an array of network servers.

This invention also features a computer readable medium having a plurality of instructions stored therein which, when executed by a computer, cause that processor to perform the steps of: receiving dimensional data concerning a multisection rail; determining the dimensions of the physical rail elements required to produce the multisection rail; and producing a material list itemizing the physical rail elements required to produce the multisection rail.

In a preferred embodiment, the computer readable medium may be a hard drive, a read-only memory, or a random access memory.

This invention also features an automated multisection rail material list generation system including: a data importer arithmetic logic unit for receiving dimensional data concerning a multisection rail; a rail calculator arithmetic logic unit, responsive to the data importer arithmetic logic unit receiving the dimensional data, for determining the dimensions of the physical rail elements required to produce the multisection rail; and a material list generator arithmetic logic unit, responsive to the rail calculator arithmetic logic unit, for producing a material list itemizing the physical rail elements required to produce the multisection rail.

BRIEF DESCRIPTION OF THE DRAWINGS

Other objects, features and advantages will occur to those skilled in the art from the following description of a preferred embodiment and the accompanying drawings, in which.

Figure 1:
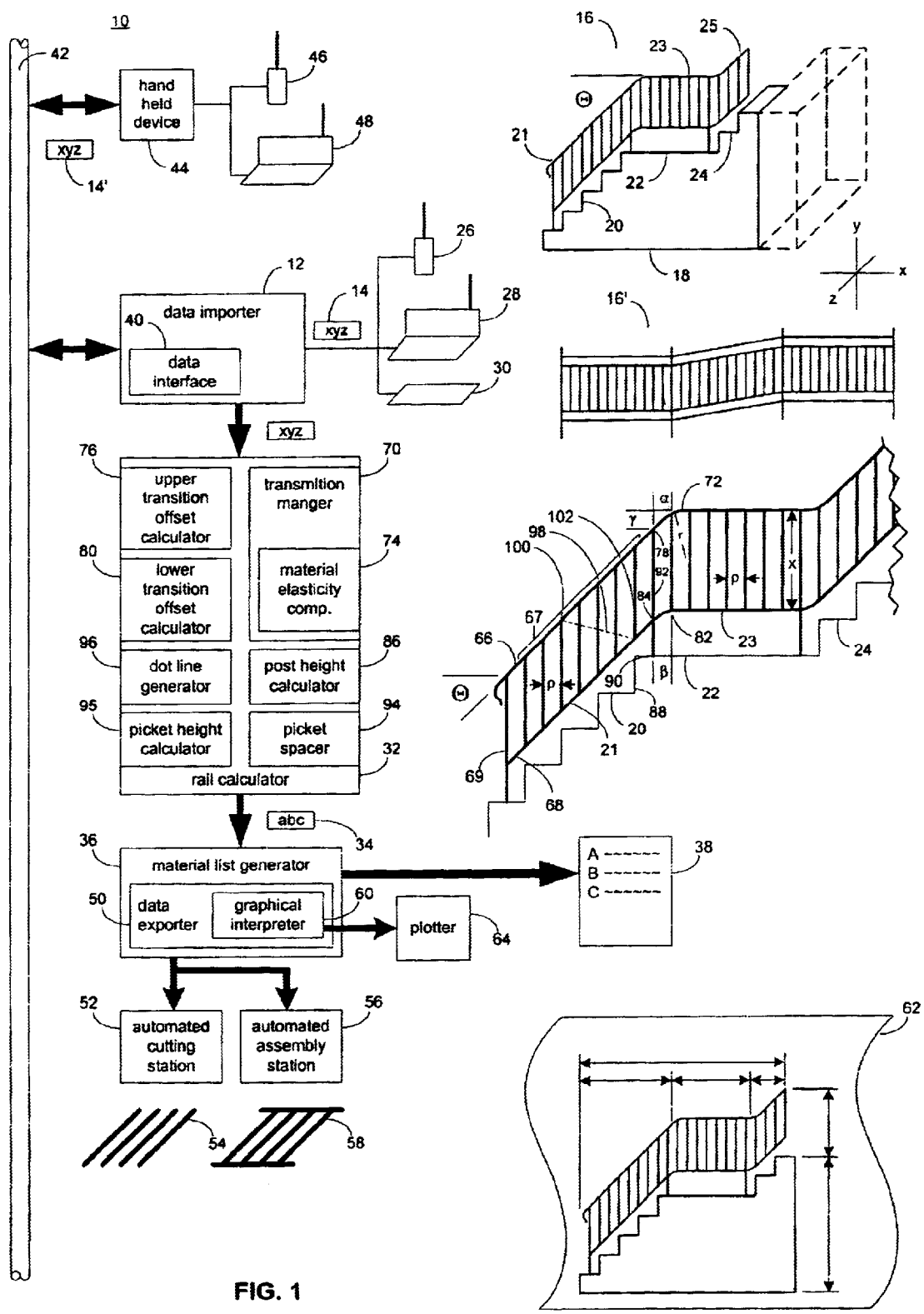
FIG. 1 is a diagrammatic view of the automated multisection rail material list generation system of this invention.

In accordance with this invention, automated multisection rail material list generation system 10, FIG. 1, includes a data importer 12 for receiving dimensional data 14 concerning a multisection rail 16 to be designed. A multisection rail 16 is a rail system which, naturally, spans a plurality of sections, where each section may be at a different angle θ in relation to adjacent sections. For example, stair 18 includes a first bevel (or stair or rake) section 20, a landing section 22, and a second bevel section 24. While multisection rail 16 is being shown constructed in a linear fashion (along the x-axis and inclining along the y-axis), this is for illustrative purposes only, as stair 18 could also include a right angle section in which stair 18 would continue in the z-axis (as shown in phantom). Further, multisection rail 16 need not be attached to a stair, as multisection rail 16' can be a rail (or fence), which contains multiple sections as it climbs a rolling hill.

Data importer 12 can receive dimensional data 14 from numerous devices such as handheld Personal Digital Assistant (PDA) 26, a laptop computer 28, or standard keyboard 30. Naturally, the use of PDA 26 or laptop 28 would enable the user to enter the required dimensions for multisection rail 16 at a work site and then download the same via a cable connection (not shown) between data importer 12 and either PDA 26 or laptop 28. Alternatively, if keyboard 30 is employed, the user of material list generation system 10 would be required to locally enter dimensional data 14 via keyboard 30.

Rail calculator 32, which is responsive to data importer 12 receiving dimensional data 14, determines the dimensions of the physical rail elements 34 required to produce each section 21, 23 and 25 of multisection rail 16. Physical rail elements 34 are the individual dimensioned pieces required to assemble the specific rail being designed. As stated above, a section of railing is typically made up of an upper rail, a lower rail and a plurality of pickets, where the rail section is anchored to the ground (or stair) via a plurality of posts. An example of dimensioned rail elements 34 would be: (2) 54" posts, (17) 34" pickets, (1) 96" upper rail, and (1) 96" lower rail.

Material list generator 36, responsive to rail calculator 32 generating physical rail elements 34, produces a material list 38 which categorizes and itemizes the physical rail elements 34, and their respective dimensions, required to produce multisection rail 16.

Data importer 12 may include a data interface 40 for connecting data importer 12 to a network 42. Network 42 can be the Internet or any standard telephone network. The use of data interface 40 enables the user of rail material list generation system 10 to download dimensional data 14' from a remote location through the use of a handheld device 44 such as PDA 46 or laptop 48.

Material list generator 36 includes a data exporter 50 for providing material list 38, which includes physical rail elements 34, to an automated cutting station 52 for producing a plurality of dimensioned components 54. Further, data exporter 50 can provide material list 38, which includes physical rail elements 34, to an automated assembly station 56 for assembling a plurality of dimensioned components 54 into a section 58 of multisection rail 16. Alternatively, automated assembly station 56 can assemble the entire multisection rail 16.

Data exporter 50 includes a graphical interpreter 60 for producing a graphical diagram 62 showing physical rail elements 34 arranged to form multisection rail 16. Graphical diagram 62 may be produced on plotter 64 or any other means of generating blueprints customary in the trade. Further, graphical diagram 62 can range in size from a handheld "a" size drawing, to a standard "e" size blueprint, to a full size (or actual size) diagram. This full size diagram would enable the user to cut the components required to build multisection rail 16 to the length shown in the diagram generated by graphical interpreter 60.

Each section 21, 23 and 25 of multisection rail 16 includes a top rail 66, a plurality of pickets 67, a bottom rail 68 and at least one post 69.

Rail calculator 32 includes a transition manager 70 for allowing the user to define a transition radius (r) at any transition point 72 between any adjacent rail sections 21 and 23. Transition radius (r) will define the curvature of the transition point 72 between the upper rail of abutting sections of railing. Therefore, while it is possible for the upper rail of section 21 to meet the upper rail of section 23 and form a sharp angle, this tends to be undesirable, as a transition radius (r) is usually utilized to smooth the transition between the upper rail of the first section 21 and the upper rail of the second section 23. Transition manager 70 includes a material elasticity compensator 74 for compensating for any change in the length of any rail bent around transition radius (r). Typically, a transition radius is bent into an upper rail (or a lower rail) through the use of a roller or a hydraulic press. During this bending process, the material being bent can be stretched or compressed, resulting in a minor change in length. While the length variation associated with one transition radius might be very small, a plurality of bends in series can result in a substantial change in length. Material elasticity compensator 74 allows for automated length compensation based on the radius of the transition point, the angle of the bend, the actual number of bends and the material being bent.

Rail calculator 32 includes an upper transition offset calculator 76 for determining the offset α an upper transition point 72 between each top rail 66 of rail sections 21 and 23 in relation to the point of contact 78 between adjacent rail sections 21 and 23. Rail calculator 32 includes lower transition offset calculator 80 for determining the offset β of a lower transition point 82 between each bottom rail 68 of each rail section 21 and 23 in relation to the point of contact 84 between abutting sections 21 and 23. Please note that the manner in which the upper offset (α) and lower offset (β) are determined is explained in greater detail in Appendix A.

Rail calculator 32 includes a post height calculator 86 for determining the required height of a post in relation to post offset and specific design criterion. Specifically, quite often the section of railing on a landing 22 will have a different overall height than the section of railing on bevel section 20 or 24. Accordingly, the post height will increase as the spacing between the riser 88 of the top step and the mounting point 90 of post 92 increases. If this post is set back far enough, the post height will be increased an amount equal to γ until the post height is equivalent to the height of the upper rail 66 on landing section 23. The specific manner in which this post height calculator determines the proper post height is explained in greater detail in Appendix A.

Rail calculator 32 includes a picket spacer 94 for analyzing the distance between adjacent posts to determine the required spacing ρ between each of the plurality of pickets 67 in response to specific design criteria and code requirements. As can be seen from the accompanying drawing, as the angle θ of incline of a stair section increases, the linear spacing (in the x axis) of the pickets would decrease if the spacing were merely measured off of the upper 66 and lower 68 rails of multisection rail 16. This is due to the fact that the spacing of the pickets, if simply measured along the upper and/or lower rails of a rail section, would vary in accordance with the cosine of the angle of incline θ. Since most building codes stipulate a maximum space allowable between adjacent pickets, the picket spacing has to be consistently laid out in accordance with the x-axis, even though the individual rails are offset from the x-axis at an angle of θ. A more detailed description of the manner in which this picket spacer 94 calculates the individual spacing of the pickets is explained in greater detail in Appendix A.

Rail calculator 32 includes a picket height calculator 95 for calculating the height χ of each of the plurality of pickets 67 in response to specific design criteria and code requirements. As can be seen from the accompanying drawing, as the height of upper rail 66 is increased (or lower rail 68 is decreased), the length of each picket is increased accordingly. A more detailed description of the manner in which this picket height calculator calculates the height of the individual pickets is explained in greater detail in Appendix A.

A dotline generator 96 calculates a linear measurement 98 between any two points on said multisection rail 16, typically a maximum length diagonal measurement. This enables the user to verify that multisection rail 16 was correctly assembled by simply measuring the spacing between points 100 and 102 on multisection rail 16. In the event that the rail was incorrectly assembled (or racked), linear measurement 98 would vary and indicate to the user that the assembly was not correct.

Figure 2:
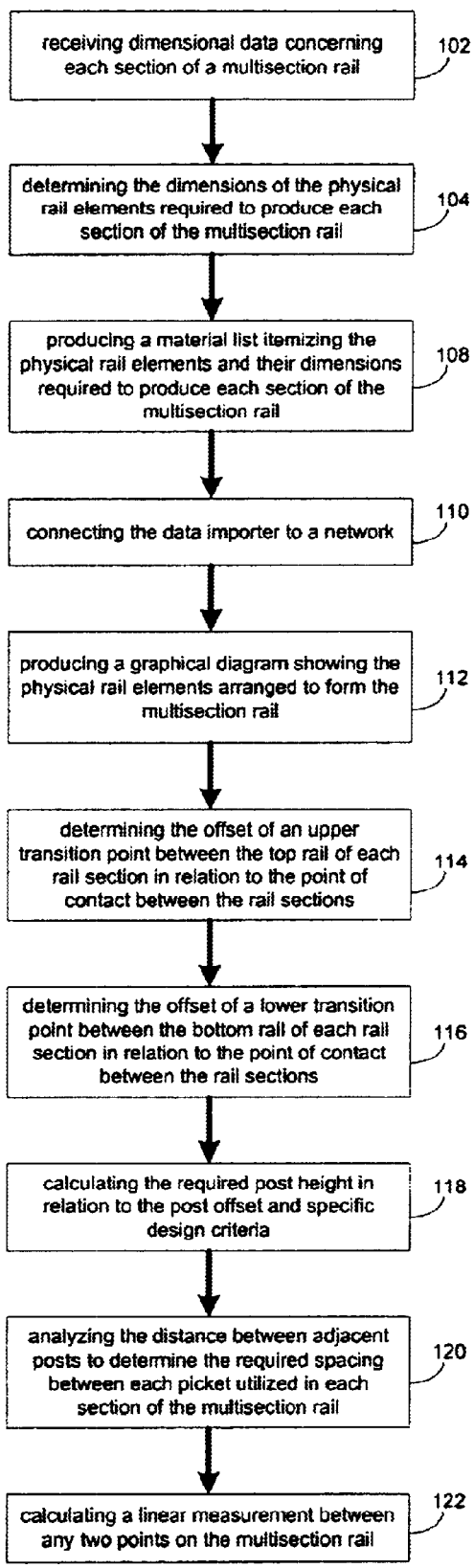
FIG. 2 is a flow chart of the automated multisection rail material list generation method of this invention.

Another embodiment of this invention is the method 100, FIG. 2, for generating a material list for a multisection rail comprising the steps of receiving 102 dimensional data concerning a multisection rail and determining 104 the dimensions of the physical rail elements required to produce the multisection rail. Method 100 then produces 108 a material list itemizing the physical rail elements required to produce the multisection rail.

The method 100 for generating a material list for a multisection rail further includes the steps of connecting 110 the data importer to a network and producing 112 a graphical diagram showing the physical rail elements arranged to form the multisection rail. Method 100 determines 114 the offset of an upper transition point between the top rail of each rail section in relation to the point of contact between the sections. Further, method 100 determines 116 the offset of a lower transition point between the bottom rail of each rail section in relation to the point of contract between the sections. Additionally, method 100 calculates 118 the required post height in relation to post offset and specific design criteria, analyzes 120 the distance between adjacent posts to determine the required spacing between each picket and calculates 122 a linear measurement between any two points on the multisection rail.

Figure 3:
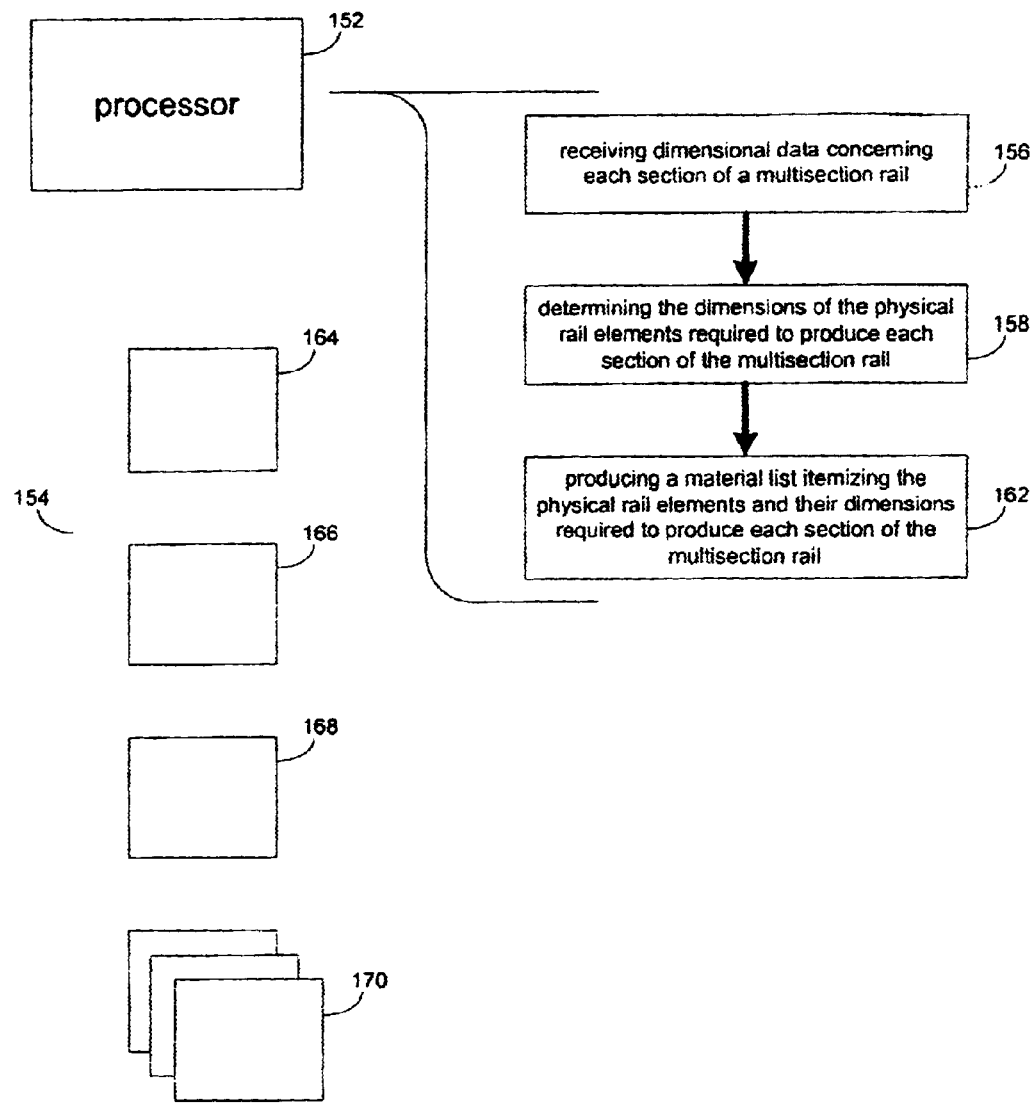
FIG. 3 is a diagrammatic view of another embodiment of the automated multisection rail material list generation system of this invention, including a processor and memory, and a flow chart showing the sequence of steps executed by the processor.

Another embodiment of the automated multisection rail material list generation system 150, FIG. 3, includes a processor 152 and memory 154 configured to perform the steps of: receiving 156 dimensional data concerning a multisection rail; determining 158 the dimensions of the physical rail elements required to produce the multisection rail; and producing 162 a material list itemizing the physical rail elements required to produce the multisection rail.

The processor 152 and memory 154 may be incorporated into: a personal computer 164; a programmable logic controller 166; a single board computer 168; or an array of network servers 170.

Figure 4:
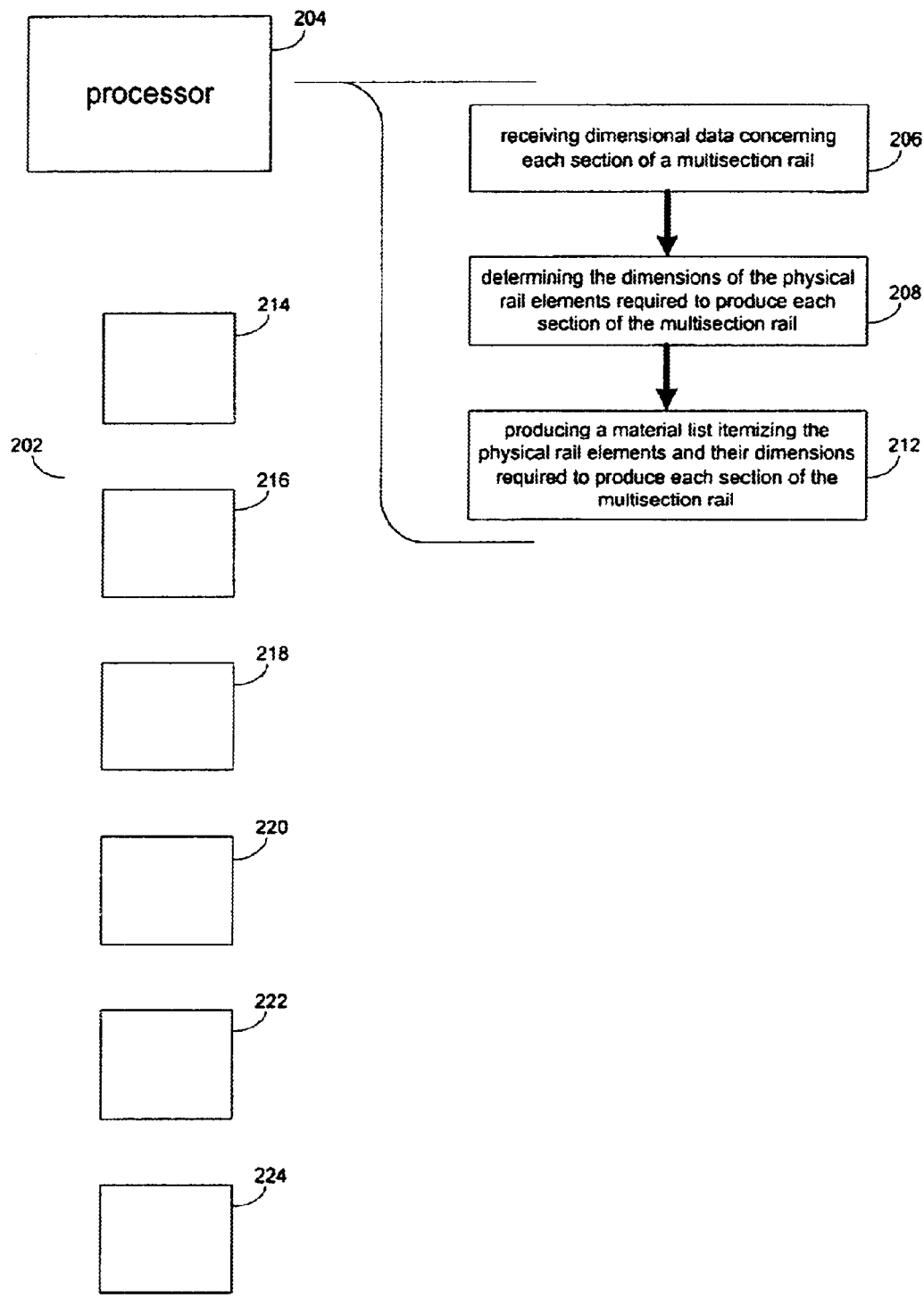
FIG. 4 is a diagrammatic view of another embodiment of the automated multisection rail material list generation system of this invention, including a processor and a computer readable medium, and a flow chart showing the sequence of steps executed by the processor.

Another embodiment of the automated multisection rail material list generation system 200, FIG. 4, includes a computer readable medium 202 having a plurality of instructions stored thereon which, when executed by processor 204, cause the processor to perform the steps of: receiving 206 dimensional data concerning a multisection rail; determining 208 the dimensions of the physical rail elements required to produce the multisection rail; and producing 212 a material list itemizing the physical rail elements required to produce the multisection rail.

Typical embodiments of computer readable medium are: hardrive 214; optical drive 216; random access memory 218; tape drive 220; RAID array 222; and read only memory 224.

Figure 5:
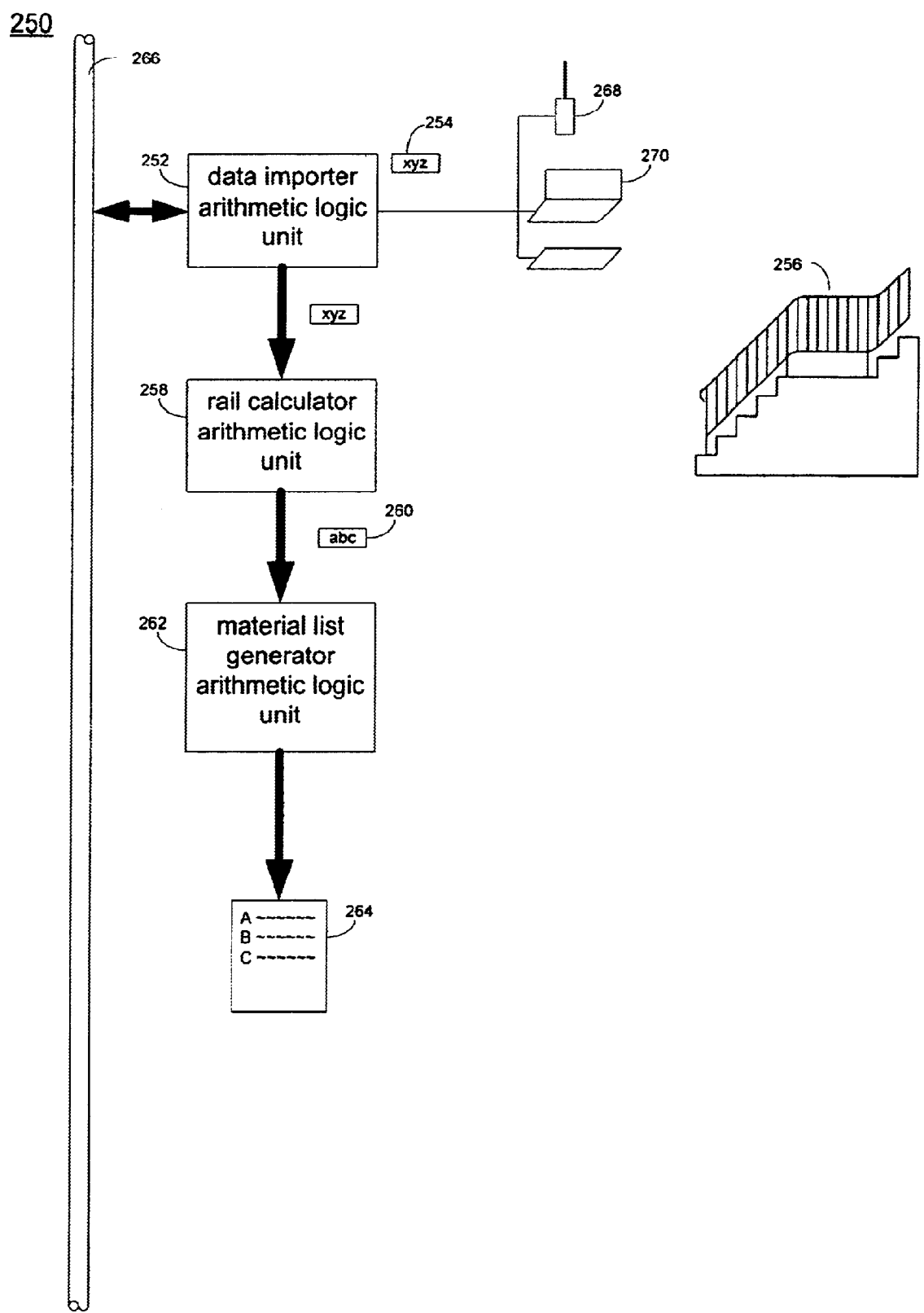
FIG. 5 is a diagrammatic view of another embodiment of the automated multisection rail material list generation system of this invention, including a data importer arithmetic logic unit, a rail calculator arithmetic logic unit, and a material list generator arithmetic logic unit.

Another embodiment of the automated multisection rail material list generation system 250, FIG. 5, includes a data importer arithmetic logic unit 252 for receiving dimensional data 254 concerning a multisection rail 256. A rail calculator arithmetic logic unit, responsive to the data importer arithmetic logic unit 252 receiving dimensional data 254, determines the dimensions of the physical rail elements 260 required to produce multisection rail 256. A material list generator arithmetic logic unit 262, responsive to rail calculator arithmetic logic unit 258, produces a material list 264 itemizing the physical rail elements 260 required to produce multisection rail 256. Data importer arithmetic logic unit 252 may be connected to an external network 266 to enable material list generation system 250 to be remotely accessible by PDA 268 or laptop 270.

It should be appreciated that these are only a few embodiments of the specific invention and that this invention and method can be constructed using any combination of hardware/firmware components and software-based algorithms.

Although specific features of this invention are shown in some drawings and not in others, this is for convenience only, as each feature may be combined with any or all of the other features in accordance with the invention. Other embodiments will occur to those skilled in the art and are within the following claims.

APPENDIX 1

This will demonstrate the technique and formulae used to design the multisection rail that meets the following specifications:

There are to be three sections in the multisection rail: a stair section, a landing, then another stair section. The resultant rail will look like figure S-100.

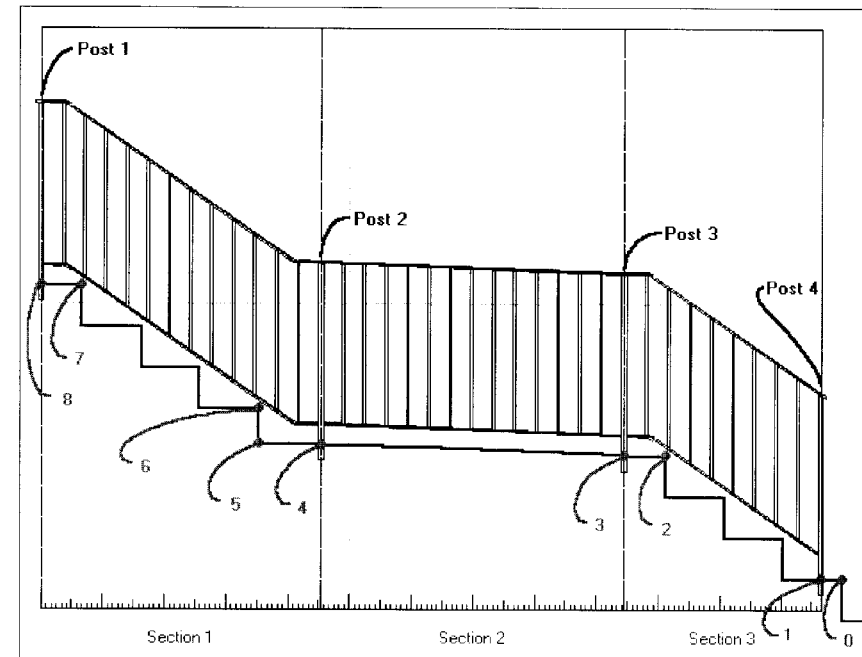

Figure S-100

The 3 sections will be referred to hereafter by their section numbers (1, 2 & 3), as indicated in figure S-100. The posts will be referred to hereafter by their post numbers (1, 2, 3 & 4) as indicated in figure S-100. (The numbered points [0 – 8] that are indicated are numbered in the order in which they will be calculated; see "Calculating Point Locations" following the Specifications.)

1

APPENDIX 1

General Rail Specifications:
1. The rail material to be used is ½" thick.
2. All posts are to be 1" thick.
3. All pickets are to be ½" thick.
4. The maximum spacing between pickets is 3 7/8".
5. The pickets are to set into the underside of the top rail to a distance that is 1/4" from the bottom of the material when measured perpendicularly from the bottom of the rail.
6. The pickets are to set into the top of the bottom rail to a distance that is 3/16" from the top of the material when measured perpendicularly from the top of the rail.
7. The rail shall extend ½" along its angle of inclination beyond the posts at each end.
8. All calculated values are to be rounded to the nearest $1/16^{th}$ of an inch.
9. Any picket within +/– ¼" of 31 ¾" will be considered a standard picket; picket heights outside of that range will be considered to be custom cut pickets.
10. All posts will be set 3" deep into the step or landing.

Specifications for Section 1:

The noseline (distance between pt. 6 and pt. 7) is 42".
The angle of the noseline is 35 degrees.
The Top Setback (distance between pt. 7 and pt. 8) is 8".
The angle of the Top Setback is 2 degrees.
The Bottom Setdown (distance between pt. 5 and pt. 6) is 6 ½".
The Bottom Setout (distance between pt. 4 and pt. 5) is 12".
The angle of the Bottom Setout is 2 degrees.
The height of the top rail shall be 34" as measured vertically from the nose of any stair.
The gap below the bottom of the bottom rail and the stair noses shall be 1 11/16".
The top rail shall level off to a height of 36" at the top of the stairs.

Specifications for Section 2:

The noseline (distance between pt. 2 and pt. 5) is 79".
The angle of the noseline is 2 degrees.
The Top Setforth (distance between pt. 4 and pt. 5) is 12".
➤ (This duplicates the data for the Bottom Setback of Section 1, as it is required to do.)
The Bottom Setback (distance between pt. 2 and pt. 3) is 8".
The rail height shall be 36" above the landing
The gap between the bottom of the bottom rail and the landing shall be 3 11/16".

Specifications for Section 3:

The noseline (distance between pt. 1 and pt. 2) is 42".
The angle of the noseline is 35 degrees.
The Top Setback (distance between pt. 2 and pt. 3) is 8".
The angle of the Top Setback is 2 degrees.
The Bottom Setback (distance between pt. 0 and pt. 1) is 4".
The height of the top rail shall be 34" as measured vertically from the nose of any stair.
The gap below the bottom of the bottom rail and the stair noses shall be 1 11/16".

APPENDIX 1

Calculating Point Locations:

The method involves calculating point locations within a Cartesian Coordinate System (a graph with a horizontal X-axis and a vertical Y-axis which cross at their respective Zero values), for the purpose of superimposing the rail onto the coordinate system. This then allows measurements between points to be easily calculated. Note that X-values increase along the horizontal X-axis from left to right; Y-values increase along the vertical Y-axis from bottom to top. Points are referred to by listing, in parentheses, the X-coordinate first, followed by a comma, then the Y-coordinate: (X, Y).

The key points of the stairs and landing (the numbered points in figure S-100) are calculated first, as follows. (The key points of the rail system are calculated afterwards, relative to these points).

Calculate location of point 0 (zero):

Point 0 is the tip of the bottom stair nose of section 3.

This will be the starting point, so it's Y-value (vertical coordinate) will be chosen to be 0 (zero). The X-value (horizontal coordinate) is calculated by first deciding that the X-coordinate of the furthest left point (point 8) will be 0. Then, the X-value of point 0 is found by adding the horizontal spaces between progressive points. Those distances are calculated by repeatedly applying the following formula:

Horizontal space = Distance between points * Cosine of angle between points

Implementation:

| Between points | Horizontal distance is: | | |
|---|---|---|---|
| 7 & 8 | 8 * Cos(2) | = 8 * 0.9994 | = 7.9951 |
| 6 & 7 | 42 * Cos(35) | = 42 * 0.8192 | = 34.4044 |
| 2 & 5 | 79 * Cos(2) | = 79 * 0.9994 | = 78.9519 |
| 1 & 2 | 42 * Cos(35) | = 42 * 0.8192 | = 34.4044 |
| Total distance: | | | = 155.7558 |

So the coordinates of point 0 (zero) are: (155.7558, 0)

(*Note that rounding to the nearest 1/16$^{th}$ inch occurs after all calculations are done, to avoid accumulating round-off errors.)

All successive point locations are calculated by applying the above formula for the "Horizontal space" to determine the relative horizontal distance from the preceding point, and by applying the following formula for the "Vertical space" to determine the relative vertical distance from the preceding point:

Vertical space = Distance between points * Sine of angle between points

APPENDIX 1

Calculate location of point 1 (one):

Point 1 is the center-point of the intersection of post 4 and the bottom step of section 3.

The angle between points 0 and 1 is 0 (zero) degrees.
The distance between points 0 and 1 is 4" (the bottom setback of section 3).
Horizontal space between points 0 and 1:   $4 * \cos(0)$   $= 4 * 1$   $= 4$
Vertical space between points 0 and 1:   $4 * \sin(0)$   $= 4 * 0$   $= 0$ Point 1 is to the left of point 0 so we subtract the horizontal distance to determine the X-coordinate of point 1:
Point 1 X-coordinate = 155.7558 − 4 = 151.7558
The Y-coordinate is the same as point 0 since the vertical space between them was 0.

So the coordinates of point 1 are: (151.7558, 0).

Calculate location of point 2:

Point 2 is the tip of the top stair nose of section 3.

The angle between points 0 and 2 is 35 degrees.
The distance between points 0 and 2 is 42" (the noseline of section 3).
Horizontal space between points 0 and 2:   $42 * \cos(35)$   $= 34.4044$
Vertical space between points 0 and 2:   $42 * \sin(35)$   $= 24.0902$ Point 2 is to the left of point 0 so we subtract the horizontal distance to determine the X-coordinate of point 2:
Point 2 X-coordinate = 151.7558 − 34.4044 = 121.3514
Point 2 is above point 0, so we add the vertical distance to determine the Y-coordinate of point 2:
Point 2 Y-coordinate = 0 + 24.0902 = 24.0902

So the coordinates of point 2 are: (121.3514, 24.0902).

Calculate location of point 3:

Point 3 is the center-point of the intersection of post 3 and the landing on which it rests.

The angle between points 2 and 3 is 2 degrees.
The distance between points 2 and 3 is 8" (the top setback of section 3).
Horizontal space between points 2 and 3:   $8 * \cos(2)$   $= 7.9951$
Vertical space between points 2 and 3:   $8 * \sin(2)$   $= 0.2792$ Point 3 is to the left of point 2 so we subtract the horizontal distance to determine the X-coordinate of point 3:
Point 3 X-coordinate = 121.3514 − 7.9951 = 113.3563
Point 3 is above point 2, so we add the vertical distance to determine the Y-coordinate of point 3:
Point 3 Y-coordinate = 24.0902 + 0.2792 = 24.3694

So the coordinates of point 3 are: (113.3563, 24.3694).

APPENDIX 1

Calculate location of point 4:

Point 4 is the center-point of the intersection of post 2 and the landing on which it rests.

The angle between points 2 and 4 is 2 degrees.
The distance between points 2 and 4 is 67" (the noseline of section 2 minus the top setforth of section 2 = 79 − 12 = 67).
Horizontal space between points 2 and 4:  67 * Cos(2)  = 66.9592
Vertical space between points 2 and 4:  67 * Sin(2)  = 2.3383

Point 4 is to the left of point 2 so we subtract the horizontal distance to determine the X-coordinate of point 4:
Point 4 X-coordinate = 121.3514 − 66.9592  = 54.3922
Point 4 is above point 2, so we add the vertical distance to determine the Y-coordinate of point 4:
Point 4 Y-coordinate = 24.0902 + 2.3383  = 26.4285

So the coordinates of point 4 are: (54.3922, 26.4285).

Calculate location of point 5:

Point 5 is at the base of the bottom step of section 1.

The angle between points 2 and 5 is 2 degrees.
The distance between points 2 and 5 is 79" (the noseline of section 2).
Horizontal space between points 2 and 5:  79 * Cos(2)  = 78.9519
Vertical space between points 2 and 5:  79 * Sin(2)  = 2.7571

Point 5 is to the left of point 2 so we subtract the horizontal distance to determine the X-coordinate of point 5:
Point 5 X-coordinate = 121.3514 − 78.9519  = 42.3995
Point 5 is above point 2, so we add the vertical distance to determine the Y-coordinate of point 5:
Point 5 Y-coordinate = 24.0902 + 2.7571  = 26.8473

So the coordinates of point 5 are: (42.3995, 26.8473).

Calculate location of point 6:

Point 6 is the tip of the bottom stair nose of section 1.

The angle between points 5 and 6 is 90 degrees.
The distance between points 5 and 6 is 6 ½" (the bottom setdown of section 1).
Horizontal space between points 5 and 6:  6.5 * Cos(90)  = 0
Vertical space between points 5 and 6:  6.5 * Sin(90)  = 6.5

Point 6 is vertically aligned with point 5 so it makes no difference whether we add or subtract the horizontal distance to determine the X-coordinate of point 6:
Point 6 X-coordinate = 42.3995 + 0 = 42.3995
Point 6 is above point 5, so we add the vertical distance to determine the Y-coordinate of point 6:
Point 6 Y-coordinate = 26.8473 + 6.5  = 33.3473

So the coordinates of point 6 are: (42.3995, 33.3473).

APPENDIX 1

Calculate location of point 7:

Point 7 is the tip of the top stair nose of section 1.

The angle between points 6 and 7 is 35 degrees.
The distance between points 6 and 7 is 42" (the noseline of section 1).
Horizontal space between points 6 and 7:   42 * Cos(35)   = 34.4044
Vertical space between points 6 and 7:   42 * Sin(35)   = 24.0902

Point 7 is to the left of point 6 so we subtract the horizontal distance to determine the X-coordinate of point 7:
Point 7 X-coordinate = 42.3995 – 34.4044   = 7.9951
Point 7 is above point 6, so we add the vertical distance to determine the Y-coordinate of point 7:
Point 7 Y-coordinate = 33.3473 + 24.0902   = 57.4375

So the coordinates of point 7 are: (7.9951, 57.4375).

Calculate location of point 8:

Point 8 is the center-point of the intersection of post 1 and the landing on which it rests.

The angle between points 7 and 8 is 2 degrees.
The distance between points 7 and 8 is 8" (the top setback of section 1).
Horizontal space between points 7 and 8:   8 * Cos(2)   = 7.9951
Vertical space between points 7 and 8:   8 * Sin(2)   = 0.2792

Point 8 is to the left of point 7 so we subtract the horizontal distance to determine the X-coordinate of point 8:
Point 8 X-coordinate = 7.9951 - 7.9951   = 0
Point 8 is above point 7, so we add the vertical distance to determine the Y-coordinate of point 8:
Point 8 Y-coordinate = 57.4375 + 0.2792   = 57.7167

So the coordinates of point 8 are: (0, 57.7167).

APPENDIX 1

The next step is to calculate the location of points 9 – 12, which are above post 4 in section 3, as indicated in figure S-110 below.

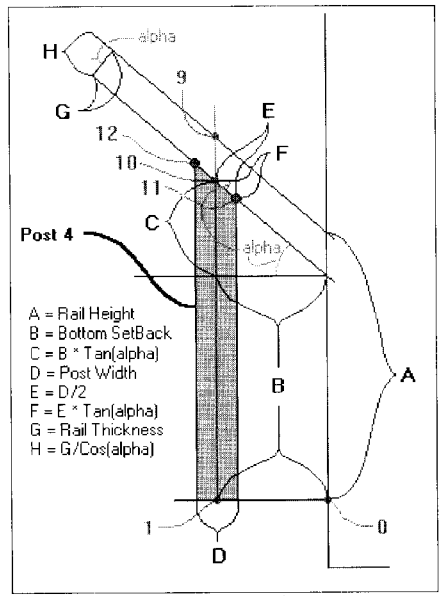

Figure S-110

Calculate location of point 9:

Point 9 is the intersection point of the top of the top rail and the center-line of post 4. We will proceed by identifying the actual values of the variables indicated in the diagram. The values come from the specifications previously indicated.

A = Rail Height = 34"
B = Bottom Setback = 4"
alpha = 35 degrees
C = B * Tan(alpha) = 4 * Tan(35) = 4 * 0.7002 = 2.8008
D = Post Width = 1"
E = D/2 = ½ = 0.5
F = E * Tan(alpha) = 0.5 * 0.7002 = 0.3501
G = Rail Thickness = 0.5
H = G/Cos(alpha) = 0.5/Cos(35) = 0.5/0.8192 = 0.6104

APPENDIX 1

The height of point 9 can be calculated from the diagram to be equal to:

$$A - H + C + H = A + C = 34 + 2.8008 = 36.8008$$

The coordinates of point 9 can now be calculated by adding the relative X and Y distances from point 1 to the coordinates of point 0 as follows:

Point 9 X-coordinate = point 1 X-coordinate = 151.7558
Point 9 Y-coordinate = point 1 Y-coordinate + 36.8008 = 0 + 36.8008 = 36.8008

So the coordinates of point 9 are (151.7558, 36.8008)

Calculate location of point 10:

Point 10 is the intersection point of the bottom of the top rail and the center-line of post 4.

It can be seen from the diagram (in figure S-110) that the X-value of point 10 will be the same as point 9, and the Y-coordinate will be less than that of point 9 by a distance equal to distance H.

Point 10 X-coordinate = point 9 X-coordinate = 151.7558.
Point 10 Y-coordinate = point 9 Y-coordinate − H = 36.8008 − 0.6104 = 36.1904

So the coordinates of point 10 are (151.7558, 36.1904)

Calculate location of point 11:

Point 11 is the top right corner of Post 4.

The X-coordinate of point 11 is greater than the X-coordinate of point 10 by the value E.
The Y-coordinate of point 11 is less than the Y-coordinate of point 10 by the value F.

Point 11 X-coordinate = point 10 X-coordinate + E = 151.7558 + 0.5 = 152.2558.
Point 11 Y-coordinate = point 10 Y-coordinate − F = 36.1904 − 0.3501 = 35.8403.

So the coordinates of point 11 are (152.2558, 35.8403)

Calculate location of point 12:

Point 12 is the top left corner of Post 4.

The X-coordinate of point 12 is less than the X-coordinate of point 10 by the value E.
The Y-coordinate of point 12 is greater than the Y-coordinate of point 10 by the value F.

Point 12 X-coordinate = point 10 X-coordinate − E = 151.7558 − 0.5 = 151.2558.
Point 12 Y-coordinate = point 10 Y-coordinate + F = 36.1904 + 0.3501 = 36.5405.

So the coordinates of point 12 are (151.2558, 36.5405)

APPENDIX 1
The next step is to calculate the location of points 13 - 18, which are located about the top of post 3, as indicated in figure S-120 below.
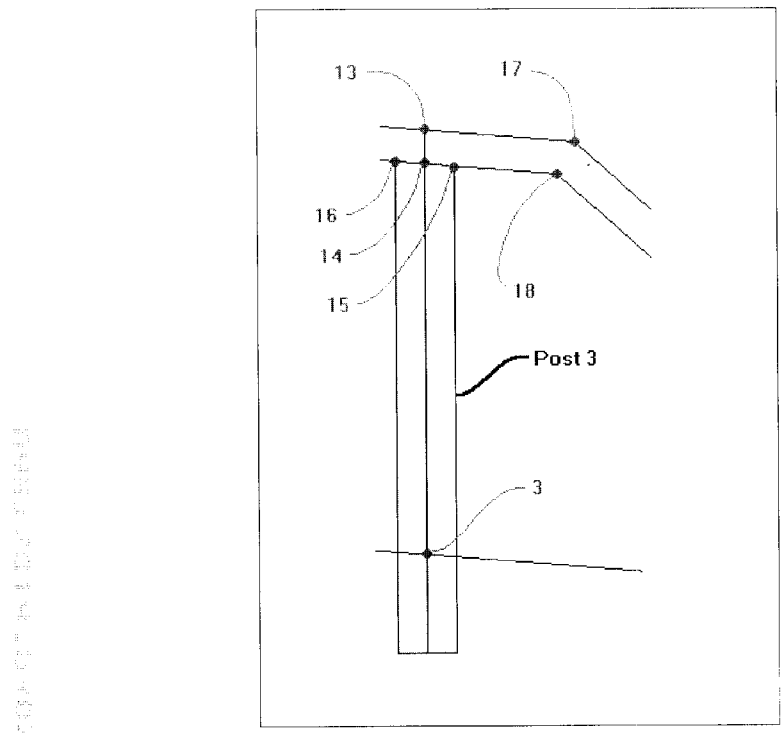
Figure S-120
The points will be calculated using the formulae and values indicated in figure S-130 on the next page.

APPENDIX 1
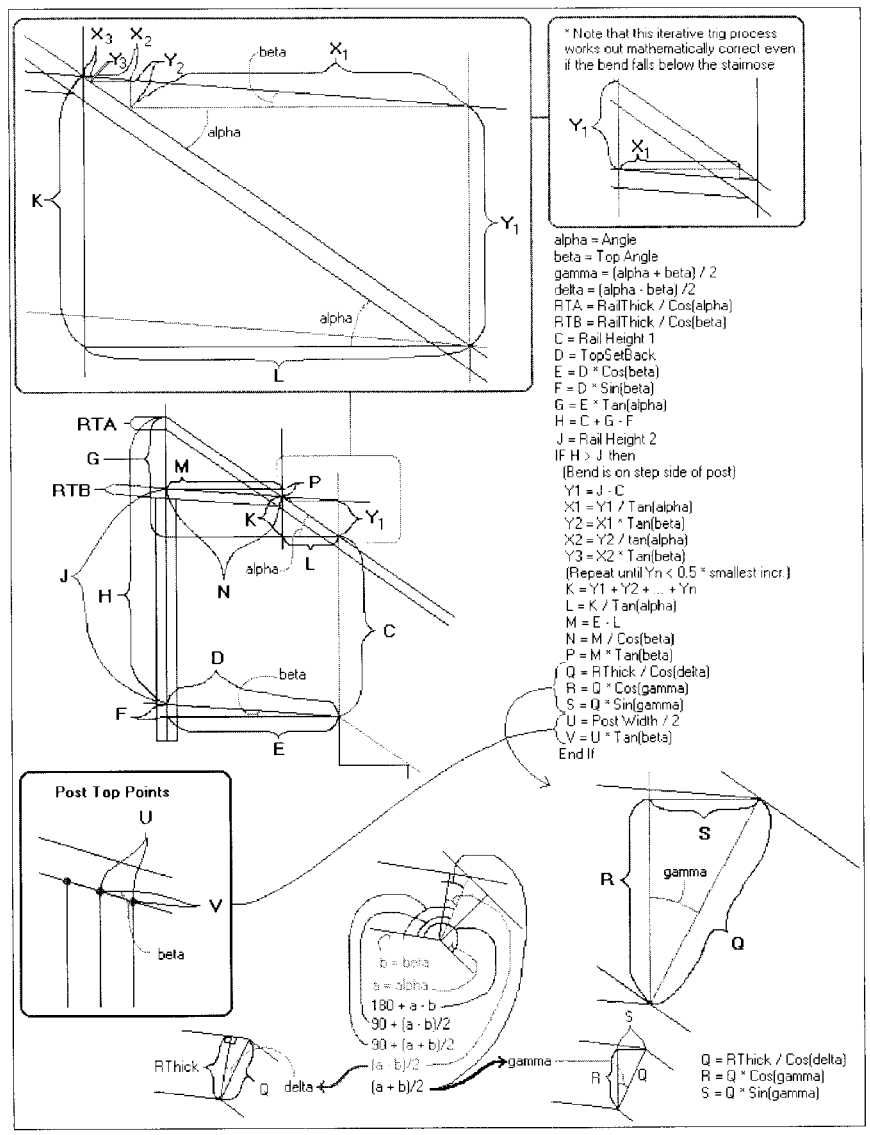
Figure S-130

APPENDIX 1

The first step will be to determine the values of the variables indicated in figure S-130. The values will then be used to determine the coordinates of points 13 – 18.

alpha = angle (of section 3 noseline) = 35
beta = top angle (of section 3) = 2
gamma = (alpha + beta) / 2 = (35 + 2) / 2 = 37 / 2 = 18.5
delta = (alpha – beta) / 2 = (35 – 2) / 2 = 33 / 2 = 16.5
RTA = Rail Thickness / Cos(alpha) = 0.5 / Cos(35) = 0.5 / 0.8192 = 0.6104
RTB = Rail Thickness / Cos(beta) = 0.5 / Cos(2) = 0.5 / 0.9994 = 0.5003
C = Rail Height 1 (of section 3) = 34
D = Top Setback (of section 3) = 8
E = D * Cos(beta) = 8 * Cos(2) = 8 * 0.9994 = 7.9951
F = D * Sin(beta) = 8 * Sin(2) = 8 * 0.0349 = 0.2792
G = E * Tan(alpha) = 7.9951 * Tan(35) = 7.9951 * 0.7002 = 5.5982
H = C + G – F = 34 + 5.5982 – 0.2792 = 39.3190
J = Rail Height 2 (of section 2) = 36
H = 39.3190 > 36 = J; so bend is on step side of post Note: The following process is used to find the intersection point of the two rails: Y1 is the distance that section 3's rail must rise to meet section 2's rail. X1 is the horizontal distance that must be covered to achieve the desired Y1 rise at the given angle (35 degrees). Y2 is the distance that section 2's rail rises, due to its own angle (2 degrees) across the span of X1. The same process is repeated to calculate X2, and then Y3. This process is repeated as many times as necessary until the resultant Y value is less than half of the value specified to be the smallest increment to which measurements are rounded. In this case values are to be rounded to the nearest $1/16^{th}$ inch (see general rail specifications above); so the process is repeated until the resultant Y value is less than $1/32^{nd}$ inch (0.0313").

Y1 = J – C = 36 – 34 = 2

X1 = Y1 / Tan(alpha) = 2 / Tan(35) = 2 / 0.7002 = 2.8563
Y2 = X1 * Tan(beta) = 2.8563 * Tan(2) = 2.8563 * 0.0349 = 0.0997

(0.0997 > 0.0313; repeat and calculate Y3)

X2 = Y2 / Tan(alpha) = 0.0997 / Tan(35) = 0.0997 / 0.7002 = 0.1424
Y3 = X2 * Tan(beta) = 0.1424 * Tan(2) = 0.1424 * 0.0349 = 0.0050

(0.0050 < 0.0313, so stop there)

K = Y1 + Y2 + Y3 = 2 + 0.0997 + 0.0050 = 2.1047
L = K / Tan(alpha) = 2.1047 / Tan(35) = 2.1047 / 0.7002 = 3.0059
M = E – L = 7.9951 - 3.0059 = 4.9892
N = M / Cos(beta) = 4.9892 / Cos(2) = 4.9892 / 0.9994 = 4.9922
P = M * Tan(beta) = 4.9892 * Tan(2) = 4.9892 * 0.0349 = 0.1742
Q = Rail Thickness / Cos(delta) = 0.5 / Cos(16.5) = 0.5 / 0.9588 = 0.5215
R = Q * Cos(gamma) = 0.5215 * Cos(18.5) = 0.5215 * 0.9483 = 0.4946
S = Q * Sin(gamma) = 0.4946 * Sin(18.5) = 0.4946 * 0.3173 = 0.1569
U = Post Width / 2 = 1 / 2 = 0.5
V = U * Tan(beta) = 0.5 * Tan(2) = 0.5 * 0.0349 = 0.0175

APPENDIX 1

These calculated values will now be used to compute the coordinates of points 13 – 18, as indicated in figure S-120.

Calculate location of point 13:

Point 13 is the intersection of the top of the top rail and the vertical center-line of post 3.

Point 13 is vertically aligned with point 3, and is higher than point 3 by the distance J, which is the rail height of section 2.
Point 13 X-coordinate = point 3 X-coordinate = 113.3563
Point 13 Y-coordinate = point 3 Y-coordinate + J = 24.3694 + 36 = 60.3694

So the coordinates of point 13 are (113.3563, 60.3694)

Calculate location of point 14:

Point 14 is the intersection of the bottom of the top rail and the vertical center-line of post 3.

Point 14 is vertically aligned with point 13, and is lower than point 13 by the distance RTB, as indicated in figure S-130.
Point 14 X-coordinate = point 13 X-coordinate = 113.3563
Point 14 Y-coordinate = point 13 Y-coordinate - RTB = 60.3694 - 0.5003 = 59.8691

So the coordinates of point 14 are (113.3563, 59.8691)

Calculate location of point 15:

Point 15 is the top right corner of post 3.

Point 15's X-coordinate is greater than point 14's X-coordinate by a value of U. Point 15's Y-coordinate is less than point 14's Y-coordinate by a value of V.

Point 15 X-coordinate = Point 14's X-coordinate + U = 113.3563 + 0.5 = 113.8563.
Point 15 Y-coordinate = Point 14's Y-coordinate – V = 59.8691 – 0.0175 = 59.8516.

So the coordinates of point 15 are (113.8563, 59.8516).

Calculate location of point 16:

Point 16 is the top left corner of post 3.

Point 16's X-coordinate is less than point 14's X-coordinate by a value of U. Point 16's Y-coordinate is greater than point 14's Y-coordinate by a value of V.

Point 16 X-coordinate = Point 14's X-coordinate – U = 113.3563 – 0.5 = 112.8563.
Point 16 Y-coordinate = Point 14's Y-coordinate + V = 59.8691 + 0.0175 = 59.8866.

So the coordinates of point 16 are (112.8563, 59.8866).

APPENDIX 1

UPPER TRANSITION OFFSET CALCULATOR

Calculate the location of point 17:

Point 17 is the top of the bend at the top of section 3, which is the transition point between the two different angles of the top rail (see figure S-120).

Point 17's X-coordinate is greater than point 13's X-coordinate by a value of M, as indicated in figure S-130. Point 17's Y-coordinate is less than point 13's Y-coordinate by a value of P, as also indicated in figure S-130.

Point 17 X-coordinate = point 13 X-coordinate + M = 113.3563 + 4.9892 = 118.3455.
Point 17 Y-coordinate = point 13 Y-coordinate - P = 60.3694 - 0.1742 = 60.1952.

So the coordinates of point 17 are (118.3455, 60.1952).

Calculate the location of point 18:

Point 18 is the bottom/inside of the bend at the top of section 3 (see figure S-120).

Point 18's X-coordinate is less than point 17's X-coordinate by a value of S, as indicated in figure S-130. Point 18's Y-coordinate is less than point 17's Y-coordinate by a value of R, as also indicated in figure S-130.

Point 18 X-coordinate = point 17 X-coordinate - S = 118.3455 - 0.1569 = 118.1886.
Point 18 Y-coordinate = point 17 Y-coordinate - R = 60.1952 - 0.4946 = 59.7006.

So the coordinates of point 18 are (118.1886, 59.7006).

APPENDIX 1
The next step is to calculate the location of points 19 - 24, which are located about the top of post 2, as indicated in figure S-140 below.
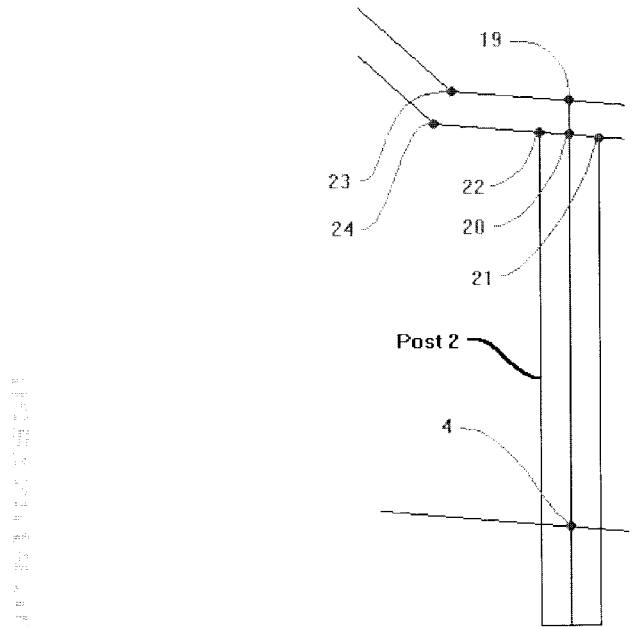
Figure S-140
The points will be calculated using the formulae and values indicated in figure S-150 on the next page.

APPENDIX 1
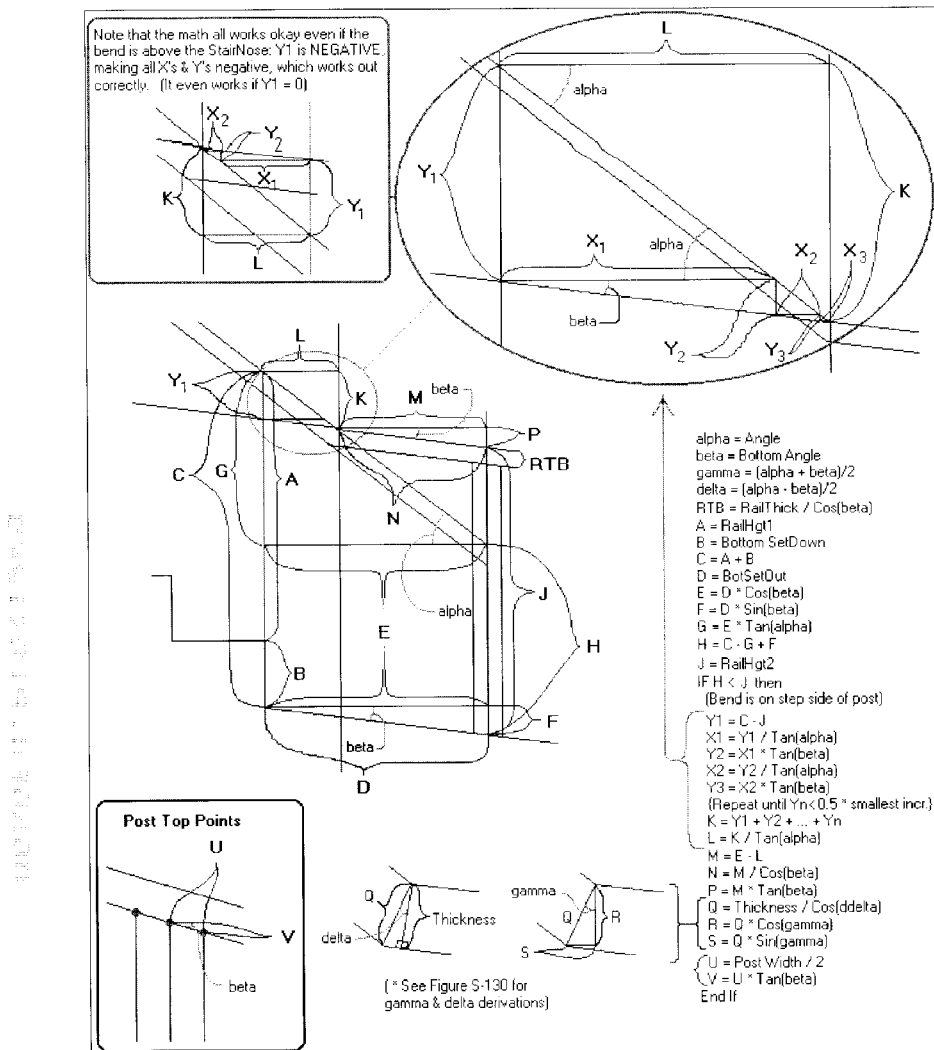
Figure S-150

APPENDIX 1

The next step will be to determine the values of the variables indicated in figure S-150. The values will then be used to determine the coordinates of points 19 – 24.

alpha = angle (of section 1 noseline) = 35
beta = bottom angle (of section 1) = 2
gamma = (alpha + beta) / 2 = (35 + 2) / 2 = 37 / 2 = 18.5
delta = (alpha − beta) / 2 = (35 − 2) / 2 = 33 / 2 = 16.5
RTB = Rail Thickness / Cos(beta) = 0.5 / Cos(2) = 0.5 / 0.9994 = 0.5003
A = Rail Height 1 (of section 1) = 34
B = Bottom Setdown (of section 1) = 6.5
C = A + B = 34 + 6.5 = 40.5
D = Bottom Setout (of section 1) = 12
E = D * Cos(beta) = 12 * Cos(2) = 12 * 0.9994 = 11.9927
F = D * Sin(beta) = 12 * Sin(2) = 12 * 0.0349 = 0.4188
G = E * Tan(alpha) = 11.9927 * Tan(35) = 11.9927 * 0.7002 = 8.3974
H = C − G + F = 40.5 − 8.3974 + 0.4188 = 32.5214
J = Rail Height 2 (of section 2) = 36
H = 32.5214 < 36 = J; so bend is on step side of post An iterative process is applied here to find the location of the transition point between the two rail heights, as was applied above to find the transition point between sections 3 and 2. The iteration stops when a calculated Y value is less than 1/32 (0.0313).

Y1 = C − J = 40.5 − 36 = 4.5

X1 = Y1 / Tan(alpha) = 4.5 / Tan(35) = 4.5 / 0.7002 = 6.4267
Y2 = X1 * Tan(beta) = 6.4267 * Tan(2) = 6.4267 * 0.0349 = 0.2244

(0.2244 > 0.0313; repeat and calculate Y3)

X2 = Y2 / Tan(alpha) = 0.2244 / 0.7002 = 0.3205
Y3 = X2 * Tan(beta) = 0.3205 * 0.0349 = 0.0112

(0.0112 < 0.0313, so stop there)

K = Y1 + Y2 + Y3 = 4.5 + 0.2244 + 0.0112 = 4.7356
L = K / Tan(alpha) = 4.7356 / 0.7002 = 6.7632
M = E − L = 11.9927 − 6.7632 = 5.2295
N = M / Cos(beta) = 5.2295 / 0.9994 = 5.2327
P = M * Tan(beta) = 5.2295 * 0.0349 = 0.1825
Q = Rail thickness / Cos(delta) = 0.5 / Cos(16.5) = 0.5 / 0.9588 = 0.5215
R = Q * Cos(gamma) = 0.5215 * Cos(18.5) = 0.5215 * 0.9483 = 0.4946
S = Q * Sin(gamma) = 0.5215 * Sin(18.5) = 0.5215 * 0.3173 = 0.1655
U = Post Width / 2 = 1 / 2 = 0.5
V = U * Tan(beta) = 0.5 * Tan(2) = 0.5 * 0.0349 = 0.0175

APPENDIX 1

These calculated values will now be used to compute the coordinates of points 19 – 24, as indicated in figure S-140.

Calculate location of point 19:

Point 19 is the intersection of the top of the top rail and the vertical center-line of post 2.

Point 19 is vertically aligned with point 4, and is higher than point 4 by the distance J, which is the rail height of section 2.
Point 19 X-coordinate = point 4 X-coordinate = 54.3922
Point 19 Y-coordinate = point 4 Y-coordinate + J = 26.4285 + 36 = 62.4285

So the coordinates of point 19 are (54.3922, 62.4285)

Calculate location of point 20:

Point 20 is the intersection of the bottom of the top rail and the vertical center-line of post 2.

Point 20 is vertically aligned with point 19, and is lower than point 19 by the distance RTB, as indicated in figure S-140.
Point 20 X-coordinate = point 19 X-coordinate = 54.3922
Point 20 Y-coordinate = point 19 Y-coordinate - RTB = 62.4285 - 0.5003 = 61.9282

So the coordinates of point 20 are (54.3922, 61.9282)

Calculate location of point 21:

Point 21 is the top right corner of post 2.

Point 21's X-coordinate is greater than point 20's X-coordinate by a value of U. Point 21's Y-coordinate is less than point 20's Y-coordinate by a value of V.

Point 21 X-coordinate = Point 20's X-coordinate + U = 54.3922 + 0.5 = 54.8922.
Point 21 Y-coordinate = Point 20's Y-coordinate – V = 61.9282 – 0.0175 = 61.9107.

So the coordinates of point 21 are (54.8922, 61.9107).

Calculate location of point 22:

Point 22 is the top left corner of post 2.

Point 22's X-coordinate is less than point 20's X-coordinate by a value of U. Point 22's Y-coordinate is greater than point 20's Y-coordinate by a value of V.

Point 22 X-coordinate = Point 20's X-coordinate – U = 54.3922 – 0.5 = 53.8922.
Point 22 Y-coordinate = Point 20's Y-coordinate + V = 61.9282 + 0.0175 = 61.9457.

So the coordinates of point 22 are (53.8922, 61.9457).

APPENDIX 1

UPPER TRANSITION OFFSET CALCULATOR

Calculate the location of point 23:

Point 23 is the top of the bend at the bottom of section 1, which is the transition point between the two different angles of the top rail (see figure S-140).

Point 23's X-coordinate is less than point 19's X-coordinate by a value of M, as indicated in figure S-130. Point 23's Y-coordinate is greater than point 19's Y-coordinate by a value of P, as also indicated in figure S-130.

Point 23 X-coordinate = point 19 X-coordinate − M = 54.3922 − 5.2295 = 49.1627.
Point 23 Y-coordinate = point 19 Y-coordinate + P = 62.4285 + 0.1825 = 62.6110.

So the coordinates of point 23 are (49.1627, 62.6110).

Calculate the location of point 24:

Point 24 is the bottom of the bend at the bottom of section 1 (see figure S-140).

Point 24's X-coordinate is less than point 23's X-coordinate by a value of S, as indicated in figure S-150. Point 24's Y-coordinate is less than point 23's Y-coordinate by a value of R, as also indicated in figure S-150.

Point 24 X-coordinate = point 23 X-coordinate − S = 49.1627 − 0.1655 = 48.9972.
Point 24 Y-coordinate = point 23 Y-coordinate − R = 62.6110 − 0.4946 = 62.1164.

So the coordinates of point 24 are (48.9972, 62.1164).

APPENDIX 1

The next step is to calculate the location of points 25 - 30, which are located about the top of post 1, as indicated in figure S-160 below.

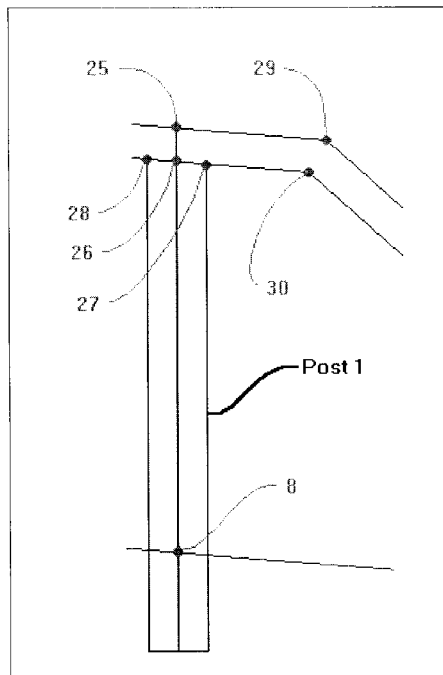

Figure S-160

Notice that the configuration of points 25 – 30 relative to point 8 is identical to the configuration of points 13 - 18 relative to point 3 in figure S-120. In fact, all relative measurements are identical, so we will use the values that were calculated above with respect to figure S-130, to determine the coordinates of points 25 – 30.

APPENDIX 1

Calculate location of point 25:

Point 25 is the intersection of the top of the top rail and the vertical center-line of post 1.

Point 25 is vertically aligned with point 8, and is higher than point 8 by the distance J, which is the height to which the rail was specified to "level off" at the top (see specifications for section 1).

Point 25 X-coordinate = point 8 X-coordinate = 0
Point 25 Y-coordinate = point 8 Y-coordinate + J = 57.7167 + 36 = 93.7167.

So the coordinates of point 25 are (0, 93.7167)

Calculate location of point 26:

Point 26 is the intersection of the bottom of the top rail and the vertical center-line of post 1.

Point 26 is vertically aligned with point 25, and is lower than point 25 by the distance RTB, as indicated in figure S-130.
Point 26 X-coordinate = point 25 X-coordinate = 0
Point 26 Y-coordinate = point 25 Y-coordinate - RTB = 93.7167 – 0.5003 = 93.2164

So the coordinates of point 26 are (0, 93.2164)

Calculate location of point 27:

Point 27 is the top right corner of post 1.

Point 27's X-coordinate is greater than point 26's X-coordinate by a value of U. Point 27's Y-coordinate is less than point 26's Y-coordinate by a value of V.

Point 27 X-coordinate = Point 26's X-coordinate + U = 0 + 0.5 = 0.5.
Point 27 Y-coordinate = Point 26's Y-coordinate – V = 93.2164 – 0.0175 = 93.1989.

So the coordinates of point 27 are (0.5, 93.1989).

Calculate location of point 28:

Point 28 is the top left corner of post 1.

Point 28's X-coordinate is less than point 26's X-coordinate by a value of U. Point 28's Y-coordinate is greater than point 26's Y-coordinate by a value of V.

Point 28 X-coordinate = Point 26's X-coordinate – U = 0 – 0.5 = -0.5.
Point 28 Y-coordinate = Point 26's Y-coordinate + V = 93.2164 + 0.0175 = 93.2339.

So the coordinates of point 28 are (-0.5, 93.2339).

APPENDIX 1

UPPER TRANSITION OFFSET CALCULATOR

Calculate the location of point 29:

Point 29 is the top of the bend at the top of section 1, which is the transition point between the two different angles of the top rail (see figure S-160).

Point 29's X-coordinate is greater than point 25's X-coordinate by a value of M, as indicated in figure S-130. Point 29's Y-coordinate is less than point 25's Y-coordinate by a value of P, as also indicated in figure S-130.

Point 29 X-coordinate = point 25 X-coordinate + M = 0 + 4.9892 = 4.9892.
Point 29 Y-coordinate = point 25 Y-coordinate − P = 93.7167 − 0.1742 = 93.5425.

So the coordinates of point 29 are (4.9892, 93.5425).

Calculate the location of point 30:

Point 30 is the bottom/inside of the bend at the top of section 3 (see figure S-160).

Point 30's X-coordinate is less than point 29's X-coordinate by a value of S, as indicated in figure S-130. Point 30's Y-coordinate is less than point 29's Y-coordinate by a value of R, as also indicated in figure S-130.

Point 30 X-coordinate = point 29 X-coordinate − S = 4.9892 − 0.1569 = 4.8323.
Point 30 Y-coordinate = point 29 Y-coordinate − R = 93.5425 − 0.4946 = 93.0479.

So the coordinates of point 30 are (4.8323, 93.0479).

APPENDIX 1

Rail End Points

There are four more points needed to complete this portion of the calculation of the top rail points; they are the top and bottom points at each end of the rail. The following diagram, Figure S-170, shows these points: #31 & #32 at the right end of the rail, and #33 & #34 at the left end. The formulae and distances indicated in the diagram will be used to calculate the locations of these points.

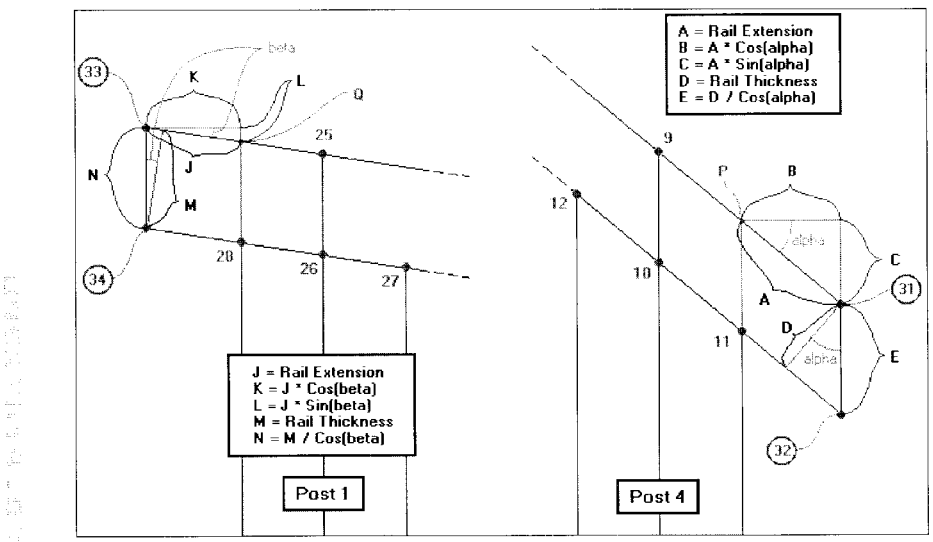

Figure S-170 alpha = angle (of section 3 noseline) = 35
A = Rail Extension = 0.5   (see general rail specifications #7.)
B = A * Cos(alpha) = 0.5 * Cos(35) = 0.5 * 0.8192 = 0.4096
C = A * Sin(alpha) = 0.5 * Sin(35) = 0.5 * 0.5736 = 0.2868
D = Rail Thickness = 0.5
E = D / Cos(alpha) = 0.5 / Cos(35) = 0.5 / 0.8192 = 0.6104 beta = Top angle (of section 1) = 2
J = Rail Extension = 0.5
K = J * Cos(beta) = 0.5 * Cos(2) = 0.5 * 0.9994 = 0.4997
L = J * Sin(beta) = 0.5 * Sin(2) = 0.5 * 0.0349 = 0.0174
M = Rail Thickness = 0.5
N = M / Cos(beta) = 0.5 / Cos(2) = 0.5 / 0.9994 = 0.5003

APPENDIX 1

Calculate the location of point 31:

Point 31 is the top right corner point of the top rail, at the right end of section 3.

It can be seen in the diagram in Figure S-170 that the X-coordinate of point 31 is greater than the X-coordinate of point 11 by a value of B. Since the vertical distance between point 11 and point P (in figure S-170) is equal to E, we can determine from the diagram that point 31's Y-coordinate is equal to point 11's Y-coordinate + E − C.

Point 31 X-coordinate = point 11 X-coordinate + B = 152.2558 + 0.4096 = 152.6654
Point 31 Y-coordinate = point 11 Y-coordinate + E − C
$\qquad$ = 35.8403 + 0.6104 − 0.2868 = 36.1639

So the coordinates of point 31 are (152.6654, 36.1639).

Calculate the location of point 32:

Point 32 is the bottom right corner point of the top rail, at the right end of section 3.

Point 32's X-coordinate is the same as point 31's, as they are vertically aligned. Point 32's Y-coordinate is less than point 31's Y-coordinate by a value of E.

Point 32 X-coordinate = point 31 X-coordinate = 152.6654.
Point 32 Y-coordinate = point 31 Y-coordinate − E = 36.1639 − 0.6104 = 35.5535.

So the coordinates of point 32 are (152.6654, 35.5535).

Calculate the location of point 33:

Point 33 is the top left corner point of the top rail, at the left end of section 1.

It can be seen in the diagram in Figure S-170 that the X-coordinate of point 33 is less than the X-coordinate of point 28 by a value of K. Since the vertical distance between point 28 and point Q (in figure S-170) is equal to N, we can determine from the diagram that point 33's Y-coordinate is equal to point 28's Y-coordinate + N + L.

Point 33 X-coordinate = point 28 X-coordinate − K = -0.5 − 0.4997 = -0.9997
Point 33 Y-coordinate = point 28 Y-coordinate + N + L
$\qquad$ = 93.2339 + 0.5003 + 0.0174 = 93.7516.

So the coordinates of point 33 are (-0.9997, 93.7516).

Calculate the location of point 34:

Point 34 is the bottom left corner point of the top rail, at the left end of section 1.

Point 34's X-coordinate is the same as point 33's, as they are vertically aligned. Point 34's Y-coordinate is less than point 33's Y-coordinate by a value of N.

Point 34 X-coordinate = point 33 X-coordinate = -0.9997.
Point 34 Y-coordinate = point 33 Y-coordinate − N = 93.7516 − 0.5003 = 93.2513.

So the coordinates of point 34 are (-0.9997, 93.2513).

APPENDIX 1
Below is an updated version of the diagram in figure S-100, with the now-calculated points (0 - 34) identified for reference. This diagram is figure S-200.
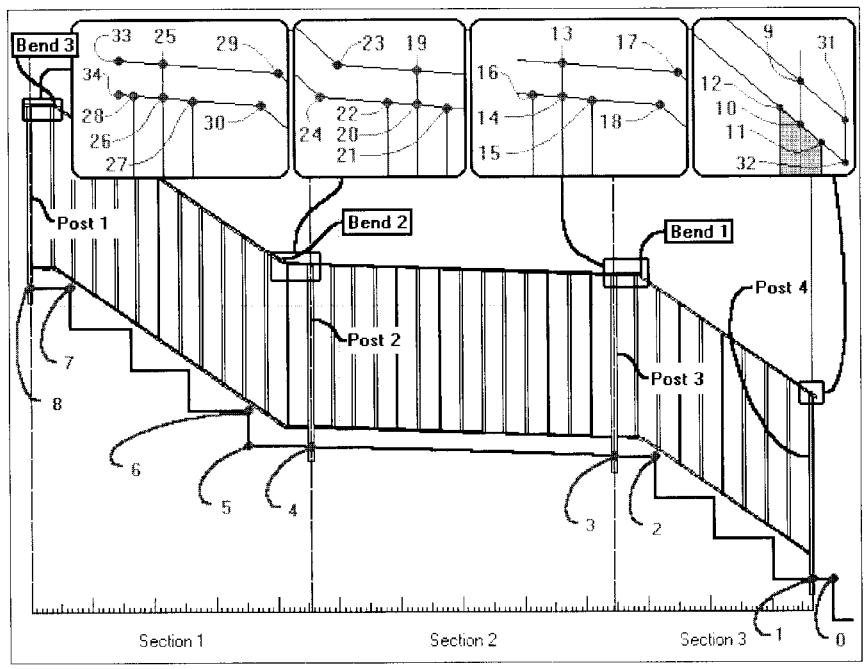
Figure S-200

APPENDIX 1

Transition Radius Calculation:

Note that there are three bends in the rail, whose locations have been calculated via the "Upper Transition Offset Calculator" (see figure S-200):

- bend 1 at points 17 & 18 in section 3
- bend 2 at points 23 & 24 in section 1
- bend 3 at points 29 & 30 in section 1

The bends have so far been depicted as sharp angles. For this example we will assume that the material being used for the top rail does not bend so sharply, as is typically the case. We will use actual data gathered for a particular iron rail material that is ½" thick, specifying the radii of curvature for different degrees of bend to determine (through interpolation) the radii of curvature to be applied to the bends in the example. We will use this information to then determine the locations of points 35 – 39 for bend 1, as indicated in the following diagram, figure S-210, as well as the similar points for the other two bends.

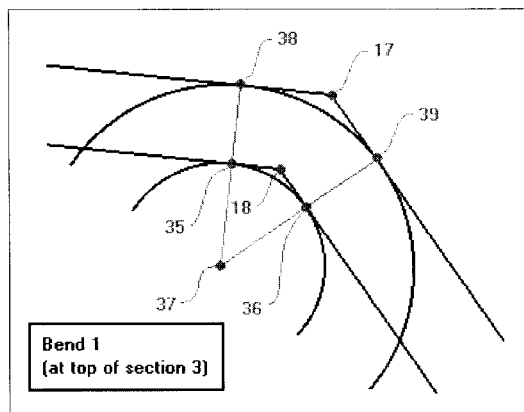

Figure S-210

Although the rail itself is a continuous piece of material, it is split up for calculation purposes into pieces that are either straight or curved; as the measurement and drawing of each type of piece are handled differently. In figure S-210, point 35 indicates where the straight portion of the rail meets the curved portion of the rail along the bottom; point 36 indicates where the curve ends and the next straight part begins. Similarly along the top for points 38 and 39, respectively. Point 37 indicates the center of curvature for the curved portion of the rail; the transition radius of curvature is measured from this point to the near (concave) side of the material. The radius to the far (convex) side of the material is then easily calculated when needed by simply adding the material thickness to the specified radius.

APPENDIX 1

The following specifications describe how the top rail material bends. For both upward and downward bends at both 30 and 40 degrees, the specifications describe the radii of curvature of the bend (measured from the side of the material that faces the center of curvature = the concave side of the curve), as well as the bend mark adjustment for each. The bend mark adjustment is the distance from the center of the arc of curvature to the place where a bend mark should be indicated on the material to achieve the desired results from the bending apparatus, whatever it may be. These values are determined through a calibration process applied to the material being used.

- When bent downward at 30 degrees, the radius of curvature (to the bottom of the material) is 3.4"; the mark adjustment is –0.5894".

- When bent downward at 40 degrees, the radius of curvature (to the bottom of the material) is 2.2"; the mark adjustment is –0.5662.

- When bent upward at 30 degrees, the radius of curvature (to the top of the material) is 2.9"; the mark adjustment is –0.4116.

- When bent upward at 40 degrees, the radius of curvature (to the top of the material) is 2.4"; the mark adjustment is –0.3643.

To interpolate the radius of curvature or the bend mark, the following formulae are applied:

(*Note that "Max Angle" and "Min Angle" refer to the 30-degree and 40-degree test values as specified above, respectively; "Max Value" and "Min Value" refer to the value (either the radius or the bend mark) associated with the "Max Angle" and "Min Angle", respectively.)

Interpolation Ratio = (Max Radius – Min Radius) / (Max Angle – Min Angle)
Interpolated value = Min Value + ((Angle – Min Angle) * Interpolation Ratio)

For all three bends, the rail is making a transition between 2 degrees and 35 degrees, so the actual angle of the bend is the difference between the angles: 35 – 2 = 33 degrees.

Transition Radius of curvature for downward bends (bend #1 & bend #3):

Interpolation Ratio = (Max Radius – Min Radius) / (Max Angle – Min Angle)
= (2.2 – 3.4) / (40 – 30) = -1.2 / 10 = -0.12
Radius = Min Radius + ((Angle – Min Angle) * Interpolation Ratio)
= 3.4 + ((33 – 30) * -0.12) = 3.4 + (3 * -0.12) = 3.4 + (-0.36) = 3.04

Transition Radius of curvature for upward bend (bend #2):

Interpolation Ratio = (Max Radius – Min Radius) / (Max Angle – Min Angle)
= (2.4 – 2.9) / (40 – 30) = -0.5 / 10 = -0.05
Radius = Min Radius + ((Angle – Min Angle) * Interpolation Ratio)
= 2.9 + ((33 – 30) * -0.05) = 2.9 + (3 * -0.05) = 2.9 + (-0.15) = 2.75

These radii will now be used in calculating the locations of points 35 – 39. The formulae indicated in the following diagram, Figure S-220, will be applied for this purpose.

APPENDIX 1
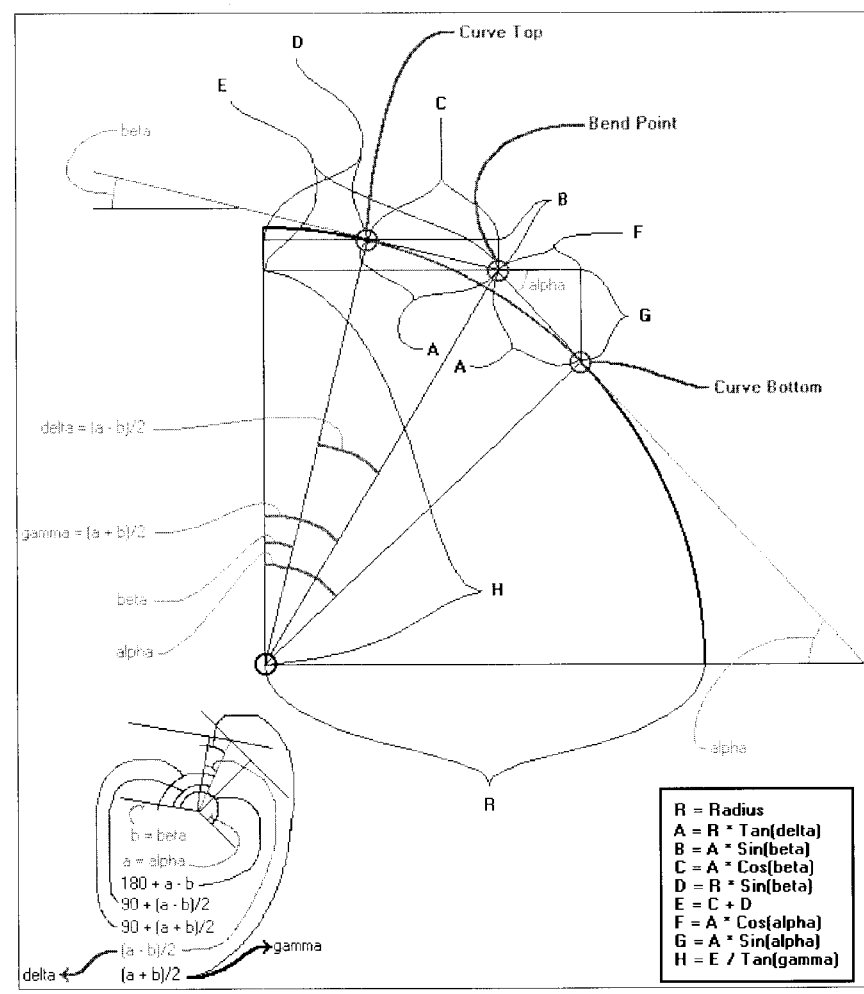
Figure S-220

APPENDIX 1

Calculations for determining points for bend 1 (see figure S-220):

alpha = 35
beta = 2
gamma = (alpha + beta) / 2 = (35 + 2) / 2 = 37 / 2 = 18.5
delta = (alpha − beta) / 2 = (35 − 2) / 2 = 33 / 2 = 16.5

R = Radius = Transition Radius of curvature for downward bends = 3.04
A = R * Tan(delta) = 3.04 * Tan(16.5) = 3.04 * 0.2962 = 0.9005
B = A * Sin(beta) = 0.9005 * Sin(2) = 0.9005 * 0.0349 = 0.0314
C = A * Cos(beta) = 0.9005 * Cos(2) = 0.9005 * 0.9994 = 0.9000
D = R * Sin(beta) = 3.04 * Sin(2) = 3.04 * 0.0349 = 0.1061
E = C + D = 0.9000 + 0.1061 = 1.0061
F = A * Cos(alpha) = 0.9005 * Cos(35) = 0.9005 * 0.8192 = 0.7376
G = A * Sin(alpha) = 0.9005 * Sin(35) = 0.9005 * 0.5736 = 0.5165
H = E / Tan(gamma) = 1.0061 / Tan(18.5) = 1.0061 / 0.3346 = 3.0069

Calculate the location of point 35 (see figure S-210):

Point 35 X-coordinate = point 18 X-coordinate − C = 118.1886 − 0.9000 = 117.2886
Point 35 Y-coordinate = point 18 Y-coordinate + B = 59.7006 + 0.0314 = 59.7320
So the coordinates of point 35 are (117.2886, 59.7320).

Calculate the location of point 36 (see figure S-210):

Point 36 X-coordinate = point 18 X-coordinate + F = 118.1886 + 0.7376 = 118.9262
Point 36 Y-coordinate = point 18 Y-coordinate − G = 59.7006 − 0.5165 = 59.1841
So the coordinates of point 36 are (118.9262, 59.1841).

Calculate the location of point 37 (see figure S-210):

Point 37 X-coordinate = point 18 X-coordinate − E = 118.1886 − 1.0061 = 117.1825
Point 37 Y-coordinate = point 18 Y-coordinate − H = 59.7006 − 3.0069 = 56.6937
So the coordinates of point 37 are (117.1825, 56.6937).

28

APPENDIX 1

Since points 38 and 39 are on the convex side of the bend, values A, B, C, F & G must be recalculated using a different Radius; specifically, the former radius plus the thickness of the material. We don't need to calculate a new D-value, E-value or H-value, since they are only used to determine the location of point 37, the center of curvature, which has already been calculated. That is, both the bottom side of the curve (concave side) and the top side (convex side) use the same center of curvature. (See figure S-220.)

R = Radius = Previously used Radius + Rail thickness = 3.04 + 0.5 = 3.54
A = R * Tan(delta) = 3.54 * Tan(16.5) = 3.54 * 0.2962 = 1.0485
B = A * Sin(beta) = 1.0485 * Sin(2) = 1.0485 * 0.0349 = 0.0366
C = A * Cos(beta) = 1.0485 * Cos(2) = 1.0485 * 0.9994 = 1.0479
F = A * Cos(alpha) = 1.0485 * Cos(35) = 1.0485 * 0.8192 = 0.8589
G = A * Sin(alpha) = 1.0485 * Sin(35) = 1.0485 * 0.5736 = 0.6014

Calculate the location of point 38 (see figure S-210):
Point 38 X-coordinate = point 17 X-coordinate − C = 118.3455 − 1.0479 = 117.2976
Point 38 Y-coordinate = point 17 Y-coordinate + B = 60.1952 + 0.0366 = 60.2318
So the coordinates of point 38 are (117.2976, 60.2318).

Calculate the location of point 39 (see figure S-210):
Point 39 X-coordinate = point 17 X-coordinate + F = 118.3455 + 0.8589 = 119.2044
Point 39 Y-coordinate = point 17 Y-coordinate − G = 60.1952 − 0.6014 = 59.5938
So the coordinates of point 39 are (119.2044, 59.5938).

Calculate Bend Mark relative offset distance for Bends:
We determine the location of the bend mark by calculating its relative distance from the center of the calculated arc of curvature for the bend (we don't actually calculate a point location for the mark). The distance calculated is applied later, when the rail length is calculated, so the location of the mark can be indicated in the appropriate location along the length of the pre-bent top rail material.

Bend Mark offset distance for downward bends (bend #1 & bend #3):

Interpolation Ratio = (Max Distance − Min Distance) / (Max Angle − Min Angle)
 = (−0.5662 − −0.5894) / (40 − 30) = 0.0232 / 10 = 0.0023
Distance = Min Distance + ((Angle − Min Angle) * Interpolation Ratio)
 = −0.5894 + ((33 − 30) * 0.0023) = −0.5894 + (3 * 0.0023)
 = −0.5894 + (0.0070) = −0.5824

Bend Mark offset distance for upward bend (bend #2):

Interpolation Ratio = (Max Distance − Min Distance) / (Max Angle − Min Angle)
 = (−0.3643 − −0.4116) / (40 − 30) = 0.0473 / 10 = 0.0047
Distance = Min Distance + ((Angle − Min Angle) * Interpolation Ratio)
 = −0.4116 + ((33 − 30) * 0.0047) = −0.4116 + (3 * 0.0047)
 = −0.4116 + (0.01419) = −0.3974

APPENDIX 1
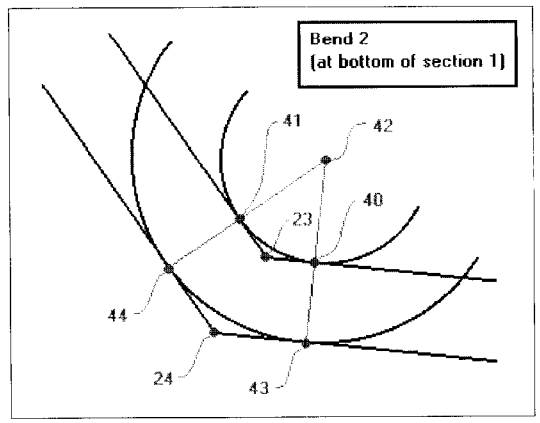
Figure S-230
Next we will calculate the locations of points 40 – 44. We will use the formulae described in the following diagram, Figure S-240. Note that the formulae in figure S-240 are identical to those of figure S-220; however, the diagram itself is a 180-degree rotation of its counterpart in figure S-220.

APPENDIX 1
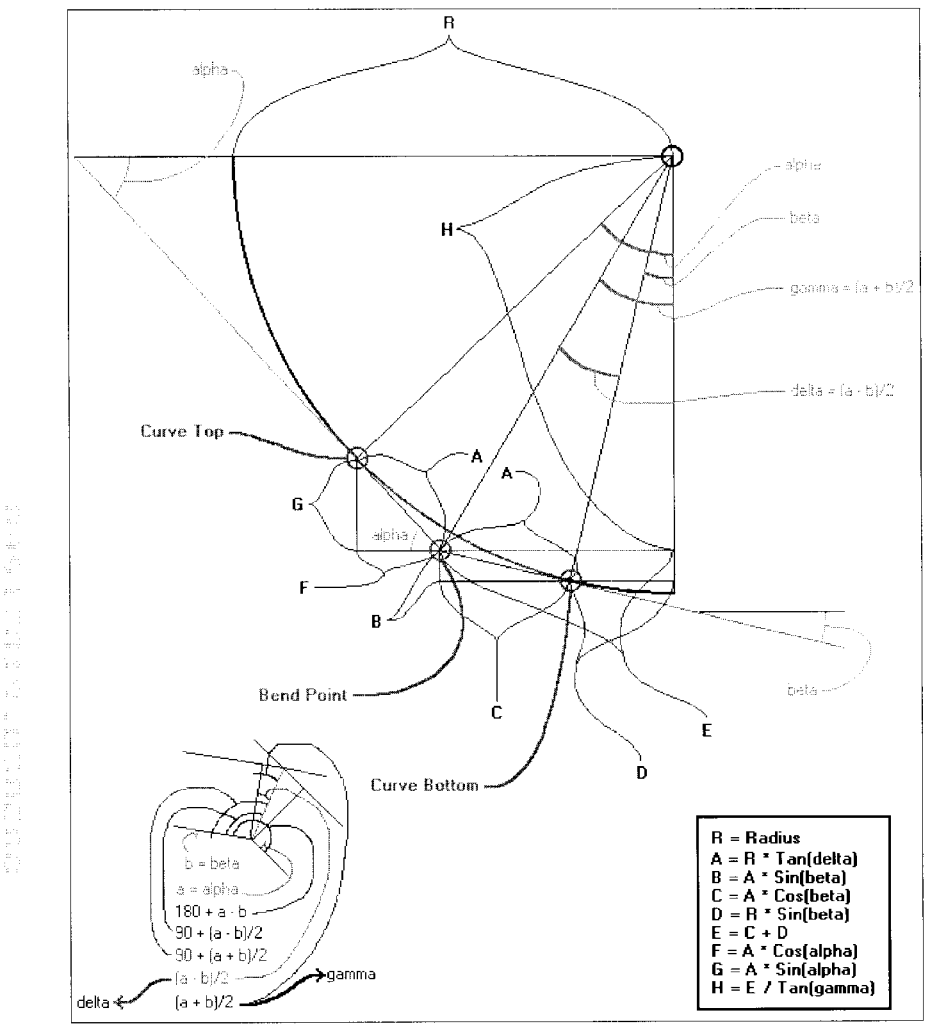
Figure S-240

APPENDIX 1

Calculations for determining points for bend 2 (see figure S-240):

alpha = 35
beta = 2
gamma = (alpha + beta) / 2 = (35 + 2) / 2 = 37 / 2 = 18.5
delta = (alpha - beta) / 2 = (35 - 2) / 2 = 33 / 2 = 16.5

R = Radius = Transition Radius of curvature for upward bend = 2.75
A = R * Tan(delta) = 2.75 * Tan(16.5) = 2.75 * 0.2962 = 0.8146
B = A * Sin(beta) = 0.9005 * Sin(2) = 0.8146 * 0.0349 = 0.0284
C = A * Cos(beta) = 0.9005 * Cos(2) = 0.8146 * 0.9994 = 0.8141
D = R * Sin(beta) = 2.75 * Sin(2) = 2.75 * 0.0349 = 0.0960
E = C + D = 0.8141 + 0.0960 = 0.9101
F = A * Cos(alpha) = 0.8146 * Cos(35) = 0.8146 * 0.8192 = 0.6673
G = A * Sin(alpha) = 0.8146 * Sin(35) = 0.8146 * 0.5736 = 0.4673
H = E / Tan(gamma) = 0.9101 / Tan(18.5) = 0.9101 / 0.3346 = 2.7200

Calculate the location of point 40 (see figure S-230):

Point 40 X-coordinate = point 23 X-coordinate + C = 49.1627 + 0.8141 = 49.9768
Point 40 Y-coordinate = point 23 Y-coordinate - B = 62.6110 - 0.0284 = 62.5826
So the coordinates of point 40 are (49.9768, 62.5826).

Calculate the location of point 41 (see figure S-230):

Point 41 X-coordinate = point 23 X-coordinate - F = 49.1627 - 0.6673 = 48.4954
Point 41 Y-coordinate = point 23 Y-coordinate + G = 62.6110 + 0.4673 = 63.0783
So the coordinates of point 41 are (48.4954, 63.0783).

Calculate the location of point 42 (see figure S-230):

Point 42 X-coordinate = point 23 X-coordinate + E = 49.1627 + 0.9101 = 50.0728
Point 42 Y-coordinate = point 23 Y-coordinate + H = 62.6110 + 2.7200 = 65.3310
So the coordinates of point 42 are (50.0728, 65.3310).

APPENDIX 1

Since points 43 and 44 are on the convex side of the bend, values A, B, C, F & G must be recalculated using a different Radius; specifically, the former radius plus the thickness of the material. We don't need to calculate a new D-value, E-value or H-value, since they are only used to determine the location of point 42, the center of curvature, which has already been calculated. That is, both the bottom side of the curve (convex side) and the top side (concave side) use the same center of curvature. (See figure S-240.)

R = Radius = Previously used Radius + Rail thickness = 2.75 + 0.5 = 3.25
A = R * Tan(delta) = 3.25 * Tan(16.5) = 3.25 * 0.2962 = 0.9627
B = A * Sin(beta) = 0.9627 * Sin(2) = 0.9627 * 0.0349 = 0.0336
C = A * Cos(beta) = 0.9627 * Cos(2) = 0.9627 * 0.9994 = 0.9621
F = A * Cos(alpha) = 0.9627 * Cos(35) = 0.9627 * 0.8192 = 0.7886
G = A * Sin(alpha) = 0.9627 * Sin(35) = 0.9627 * 0.5736 = 0.5522

Calculate the location of point 43 (see figure S-230):
Point 43 X-coordinate = point 24 X-coordinate + C = 48.9972 + 0.9621 = 49.9593
Point 43 Y-coordinate = point 24 Y-coordinate − B = 62.1164 − 0.0336 = 62.0828
So the coordinates of point 43 are (49.9593, 62.0828).

Calculate the location of point 44 (see figure S-230):
Point 44 X-coordinate = point 24 X-coordinate − F = 48.9972 − 0.7886 = 48.2086
Point 44 Y-coordinate = point 24 Y-coordinate + G = 62.1164 + 0.5522 = 62.6686
So the coordinates of point 44 are (48.2086, 62.6686).

APPENDIX 1

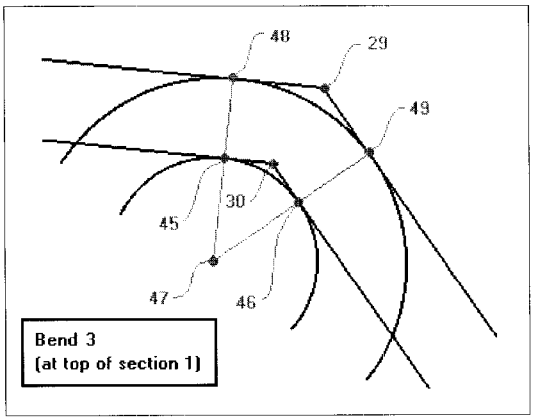

Figure S-250

Calculations for determining points for bend 3 (see figure S-220):
alpha = 35
beta = 2
gamma = (alpha + beta) / 2 = (35 + 2) / 2 = 37 / 2 = 18.5
delta = (alpha − beta) / 2 = (35 − 2) / 2 = 33 / 2 = 16.5

R = Radius = Transition Radius of curvature for downward bends = 3.04
A = R * Tan(delta) = 3.04 * Tan(16.5) = 3.04 * 0.2962 = 0.9005
B = A * Sin(beta) = 0.9005 * Sin(2) = 0.9005 * 0.0349 = 0.0314
C = A * Cos(beta) = 0.9005 * Cos(2) = 0.9005 * 0.9994 = 0.9000
D = R * Sin(beta) = 3.04 * Sin(2) = 3.04 * 0.0349 = 0.1061
E = C + D = 0.9000 + 0.1061 = 1.0061
F = A * Cos(alpha) = 0.9005 * Cos(35) = 0.9005 * 0.8192 = 0.7376
G = A * Sin(alpha) = 0.9005 * Sin(35) = 0.9005 * 0.5736 = 0.5165
H = E / Tan(gamma) = 1.0061 * Tan(18.5) = 1.0061 / 0.3346 = 3.0069

Calculate the location of point 45 (see figure S-250):
Point 45 X-coordinate = point 30 X-coordinate − C = 4.8323 − 0.9000 = 3.9323
Point 45 Y-coordinate = point 30 Y-coordinate + B = 93.0479 + 0.0314 = 93.0793
So the coordinates of point 45 are (3.9323, 93.0793).

Calculate the location of point 46 (see figure S-250):
Point 46 X-coordinate = point 30 X-coordinate + F = 4.8323 + 0.7376 = 5.5699
Point 46 Y-coordinate = point 30 Y-coordinate − G = 93.0479 − 0.5165 = 92.5314
So the coordinates of point 46 are (5.5699, 92.5314).

Calculate the location of point 47 (see figure S-250):
Point 47 X-coordinate = point 30 X-coordinate − E = 4.8323 − 1.0061 = 3.8262
Point 47 Y-coordinate = point 30 Y-coordinate − H = 93.0479 − 3.0069 = 90.0410
So the coordinates of point 47 are (3.8262, 90.041).

34

APPENDIX 1

Since points 48 and 49 are on the convex side of the bend, values A, B, C, F & G must be recalculated using a different Radius; specifically, the former radius plus the thickness of the material. We don't need to calculate a new D-value, E-value or H-value, since they are only used to determine the location of point 47, the center of curvature, which has already been calculated. That is, both the bottom side of the curve (concave side) and the top side (convex side) use the same center of curvature. (See figure S-220.)

R = Radius = Previously used Radius + Rail thickness = 3.04 + 0.5 = 3.54
A = R * Tan(delta) = 3.54 * Tan(16.5) = 3.54 * 0.2962 = 1.0485
B = A * Sin(beta) = 1.0485 * Sin(2) = 1.0485 * 0.0349 = 0.0366
C = A * Cos(beta) = 1.0485 * Cos(2) = 1.0485 * 0.9994 = 1.0479
F = A * Cos(alpha) = 1.0485 * Cos(35) = 1.0485 * 0.8192 = 0.8589
G = A * Sin(alpha) = 1.0485 * Sin(35) = 1.0485 * 0.5736 = 0.6014

Calculate the location of point 48 (see figure S-250):
Point 48 X-coordinate = point 29 X-coordinate − C = 4.9892 − 1.0479 = 3.9413
Point 48 Y-coordinate = point 29 Y-coordinate + B = 93.5425 + 0.0366 = 93.5791
So the coordinates of point 48 are (3.9413, 93.5791).

Calculate the location of point 49 (see figure S-250):
Point 49 X-coordinate = point 29 X-coordinate + F = 4.9892 + 0.8589 = 5.8481
Point 49 Y-coordinate = point 29 Y-coordinate − G = 93.5425 − 0.6014 = 92.9411
So the coordinates of point 49 are (5.8481, 92.9411).

APPENDIX 1

Apply distance formulae and Material Elasticity Compensator to determine length of top rail:

We now have the coordinates calculated for all points needed to draw the rail, as well as the necessary radii of curvature for the bends. This data can now also be utilized to calculate the length of the top rail. Because the material used to make the top rail tends to stretch when bent, a Material Elasticity Compensator is applied when calculating the length of the curved portions of the rail. The length calculation will now be explained in detail.

Calculating length of straight portions of top rail

The standard algebraic distance formula is used to determine the length of straight portions of rail. Given the X and Y-coordinates of any two points (X1, Y1) and (X2, Y2), the following formula determines the length of a straight line connecting the two points:

Distance = Square Root $[(X2 - X1)^2 + (Y2 - Y1)^2]$

Calculating length of curved portions of top rail

Measuring the curved portions of the top rail involves using an elasticity ratio during the process of calculating the arclength. The specified elasticity ratio is multiplied by the thickness of the material, and the result is added to the bend's transition radius to determine the radius used when calculating the arclength. Assuming that some portion of the material may stretch when bent (most likely on the convex side of the curve), and some portion may compress when bent (most likely on the concave side of the curve), the calculated radius represents the dividing line within the thickness of the material that is between the stretched portion and the compressed portion; the line of no change. This will indicate the pre-bent/pre-stretched length of material to use to achieve the desired size and length of arc when bent.

Using data gathered for the same material for which the transition radii were measured, the following elasticity ratios have been determined:

Downward Bend Elasticity Ratio: 0.7097
Upward Bend Elasticity Ratio: 0.2903

Once the compensatory radius has been calculated, it is used in the distance formula below to calculate the arc-measure used for the curve when calculating the rail length.

Arclength is calculated by first converting the degree measure of the arc to radians using the following formula:

**Radians = Degrees * (Pi/180)**

(Pi is approximately equal to 3.14159265358979.)

Once the radian measure of the arc is determined, the length of the arc is found using the following arclength formula:

**Arclength = Angle(in radians) * Radius**

APPENDIX 1

For convenience, all of the calculated point coordinates (0 – 49) are listed again below.

Base Points 0 – 8:

| | | |
|---|---|---|
| Pt. 0: | (155.7558, | 0) |
| Pt. 1: | (151.7558, | 0) |
| Pt. 2: | (121.3514, | 24.0902) |
| Pt. 3: | (113.3563, | 24.3694) |
| Pt. 4: | (54.3922, | 26.4285) |
| Pt. 5: | (42.3995, | 26.8473) |
| Pt. 6: | (42.3995, | 33.3473) |
| Pt. 7: | (7.9951, | 57.4375) |
| Pt. 8: | (0, | 57.7167) |

Four groups of Post Top Points (& Initial Bend Points) 9 - 30:

| | | |
|---|---|---|
| Pt. 9: | (151.7558, | 36.8008) |
| Pt. 10: | (151.7558, | 36.1904) |
| Pt. 11: | (152.2558, | 35.8403) |
| Pt. 12: | (151.2558, | 36.5405) |
| Pt. 13: | (113.3563, | 60.3694) |
| Pt. 14: | (113.3563, | 59.8691) |
| Pt. 15: | (113.8563, | 59.8516) |
| Pt. 16: | (112.8563, | 59.8866) |
| Pt. 17: | (118.3455, | 60.1952) |
| Pt. 18: | (118.1886, | 59.7006) |
| Pt. 19: | (54.3922, | 62.4285) |
| Pt. 20: | (54.3922, | 61.9282) |
| Pt. 21: | (54.8922, | 61.9107) |
| Pt. 22: | (53.8922, | 61.9457) |
| Pt. 23: | (49.1627, | 62.6110) |
| Pt. 24: | (48.9972, | 62.1164) |
| Pt. 25: | (0, | 93.7167) |
| Pt. 26: | (0, | 93.2164) |
| Pt. 27: | (0.5, | 93.1989) |
| Pt. 28: | (-0.5, | 93.2339) |
| Pt. 29: | (4.9892, | 93.5425) |
| Pt. 30: | (4.8323, | 93.0479) |

Rail End Points 31 – 34:

| | | |
|---|---|---|
| Pt. 31: | (152.6654, | 36.1639) |
| Pt. 32: | (152.6654, | 35.5535) |
| Pt. 33: | (-0.9997, | 93.7516) |
| Pt. 34: | (-0.9997, | 93.2513) |

APPENDIX 1

Bend 1 Points 35 – 39:

Pt. 35: (117.2886,  59.7320)
Pt. 36: (118.9262,  59.1841)
Pt. 37: (117.1825,  56.6937)
Pt. 38: (117.2976,  60.2318)
Pt. 39: (119.2044,  59.5938)

Bend 2 Points 40 – 44:

Pt. 40: (49.9768,  62.5826)
Pt. 41: (48.4954,  63.0783)
Pt. 42: (50.0728,  65.3310)
Pt. 43: (49.9593,  62.0828)
Pt. 44: (48.2086,  62.6686)

Bend 3 Points 45 – 49:

Pt. 45: (3.9323,  93.0793)
Pt. 46: (5.5699,  92.5314)
Pt. 47: (3.8262,  90.041)
Pt. 48: (3.9413,  93.5791)
Pt. 49: (5.8481,  92.9411)

The previously indicated transition radii, elasticity ratios, and bend mark relative offset distances are repeated below also, for convenience.

Transition Radius of curvature for downward bends (bends #1 & #3): 3.04
Transition Radius of curvature for upward bend (bend #2): 2.75

Downward Bend Elasticity Ratio: 0.7097
Upward Bend Elasticity Ratio: 0.2903

Bend Mark offset distance for downward bends (bend #1 & #3): -0.5824
Bend Mark offset distance for upward bend (bend #2): -0.3974

APPENDIX 1

The length of top rail needed can be found by determining and adding together the length of the following portions of the rail, as indicated in figure S-260 below:

1. The portion of straight rail from the top right end of the rail to the right end of bend 1 (from point 31 to point 39)
2. The portion of curved rail in bend 1
3. The portion of straight rail from the left end of bend 1 to the right end of bend 2 (between points 38 and 40)
4. The portion of curved rail in bend 2
5. The portion of straight rail from the left end of bend 2 to the right end of bend 3 (between points 41 and 49)
6. The portion of curved rail in bend 3
7. The portion of straight rail from the left end of bend 3 to the top left end of the rail (from point 48 to point 33)

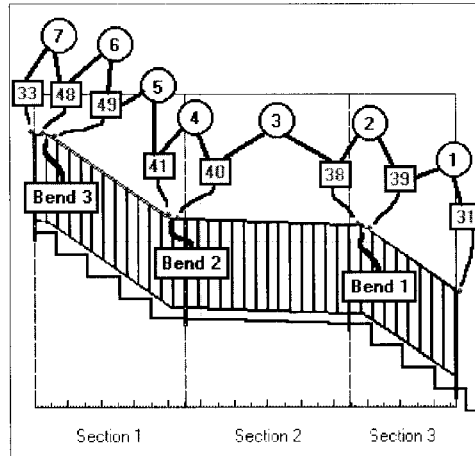

Figure S-260

1. Distance between points 31 and 39:

Distance = Square Root $[(X_{39} - X_{31})^2 + (Y_{39} - Y_{31})^2]$

= Square Root $[(119.2044 - 152.6654)^2 + (59.5938 - 36.1639)^2]$

= Square Root $[(-33.461)^2 + (23.4299)^2]$

= Square Root $[1119.638521 + 548.9602]$

= Square Root $[1668.5987]$

= 40.8485

APPENDIX 1

2. Length for bend 1:

Transition Radius for downward bends: 3.04
Downward Bend Elasticity Ratio: 0.7097
Material Thickness: 0.5
Degree of bend: 33

Radians = degrees * (Pi/180) = 33 * (3.1416/180) = 0.5760
Calculation Radius = Transition radius + (elasticity ratio * material thickness)
$\quad\quad\quad$ = 3.04 + (0.7097 * 0.5) = 3.04 + 0.3549 = 3.3949

Length = Radians * Calculation Radius = 0.5760 * 3.3949
$\quad\quad$ = 1.9554

3. Distance between points 38 and 40:

Distance = Square Root $[(X_{40} - X_{38})^2 + (Y_{40} - Y_{38})^2]$ $\quad\quad$ = Square Root $[(49.9768 - 117.2976)^2 + (62.5826 - 60.2318)^2]$ $\quad\quad$ = Square Root $[(-67.3208)^2 + (2.3508)^2]$ $\quad\quad$ = Square Root $[4532.0901 + 5.5263]$ $\quad\quad$ = Square Root $[4537.6164]$ $\quad\quad$ = 67.3618

4. Length for bend 2:

Transition Radius for upward bends: 2.75
Upward Bend Elasticity Ratio: 0.2903
Material Thickness: 0.5
Degree of bend: 33

Radians = degrees * (Pi/180) = 33 * (3.1416/180) = 0.5760
Calculation Radius = Transition radius + (elasticity ratio * material thickness)
$\quad\quad\quad$ = 2.75 + (0.2903 * 0.5) = 2.75 + 0.1452 = 2.8952

Length = Radians * Calculation Radius = 0.5760 * 2.8952
$\quad\quad$ = 1.6676

5. Distance between points 41 and 49:

Distance = Square Root $[(X_{49} - X_{41})^2 + (Y_{49} - Y_{41})^2]$ $\quad\quad$ = Square Root $[(5.8481 - 48.4954)^2 + (92.9411 - 63.0783)^2]$ $\quad\quad$ = Square Root $[(-42.6473)^2 + (29.8628)^2]$ $\quad\quad$ = Square Root $[1818.7922 + 891.7868]$ $\quad\quad$ = Square Root $[2710.5790]$ $\quad\quad$ = 52.0632

APPENDIX 1

6. Length for bend 3:

Transition Radius for downward bends: 3.04
Downward Bend Elasticity Ratio: 0.7097
Material Thickness: 0.5
Degree of bend: 33

Radians = degrees * (Pi/180) = 33 * (3.1416/180) = 0.5760
Calculation Radius = Transition radius + (elasticity ratio * material thickness)
 = 3.04 + (0.7097 * 0.5) = 3.04 + 0.3549 = 3.3949

Length = Radians * Calculation Radius = 0.5760 * 3.3949
 = 1.9554

7. Distance between points 48 and 33:

Distance = Square Root $[(X_{33} - X_{48})^2 + (Y_{33} - Y_{48})^2]$

= Square Root $[(-0.9997 - 3.9413)^2 + (93.7516 - 93.5791)^2]$

= Square Root $[(-4.9410)^2 + (0.1725)^2]$

= Square Root [24.4135 + 0.0298]

= Square Root [24.4432]

= 4.9440

The total length is the sum of the 7 values:

Total length = 40.8485 + 1.9554 + 67.3618 + 1.6676 + 52.0632 + 1.9554 + 4.9440
 = 170.7959

Rounded to the nearest 1/16$^{th}$ inch, the length is 170 13/16".

APPENDIX 1

Calculating Bend Mark Distances:

We determine the bend mark distances by determining the distance to the center of the bend, then for downward bends, adding the calculated offsets; for upward bends, subtracting them. In this case, the measurements are taken from the left end of the rail.

Bend Mark for Bend #3:

The distance to the center of the bend is found by adding distance 7 (calculated above) and half of distance 6:

Distance to center of bend #3 = [Length #7] + ([Length #6]/2)
= 4.9440 + (1.9554/2) = 4.9440 + 0.9997 = 5.9217

Adding the offset tells us the distance from the left end of the rail at which to make the mark:

Mark Distance for Bend 3 = 5.9217 + Bend Mark offset distance for downward bends
= 5.9217 + (-0.5824) = 5.3393

Bend Mark for Bend #2:

The distance to the center of the bend is found by adding distances 7, 6 and 5 (calculated above) and half of distance 4:

Distance to center of bend 2 = [Length #7] + [Length #6] + [Length #5] + ([Length #4]/2)
= 4.9440 + 1.9554 + 52.0632 + (1.6676/2)
= 4.9440 + 1.9554 + 52.0632 + 0.8338 = 59.7964

Subtracting the offset (since it is an upward bend) tells us the distance from the left end of the rail at which to make the mark:

Mark Distance for Bend 2 = 59.7964 + Bend Mark offset distance for upward bends

= 59.7964 − (−0.3974) = 60.1938

Bend Mark for Bend #1:

The distance to the center of the bend is found by adding distances 7 through 3 (calculated above) and half of distance 2:

Dist. to center of bend #3 = [L7] + [L6] + [L5] + [L4] + [L3] + [L2/2]
= 4.9440 + 1.9554 + 52.0632 + 1.6676 + 67.3618 + (1.9554/2)
= 4.9440 + 1.9554 + 52.0632 + 1.6676 + 67.3618 + 0.9777
= 128.9697

Adding the offset tells us the distance from the left end of the rail at which to make the mark:

Mark Distance for Bend 3 = 128.9697 + Bend Mark offset distance for downward bends

= 128.9697 + (−0.5824) = 128.3873

APPENDIX 1

Bottom Rail Point Location Calculation

The next step will be to calculate the point locations for a section of bottom rail. We will only do this for the piece of bottom rail in section 3. Once we have point locations for both the top rail and bottom rail in that section, we can calculate picket heights.

The following diagram, Figure S-300, shows the location of points 50 and 51 that are to be calculated next. Point 50 is the bottom right corner of the rail where it meets post 4; point 51 is the top right corner.

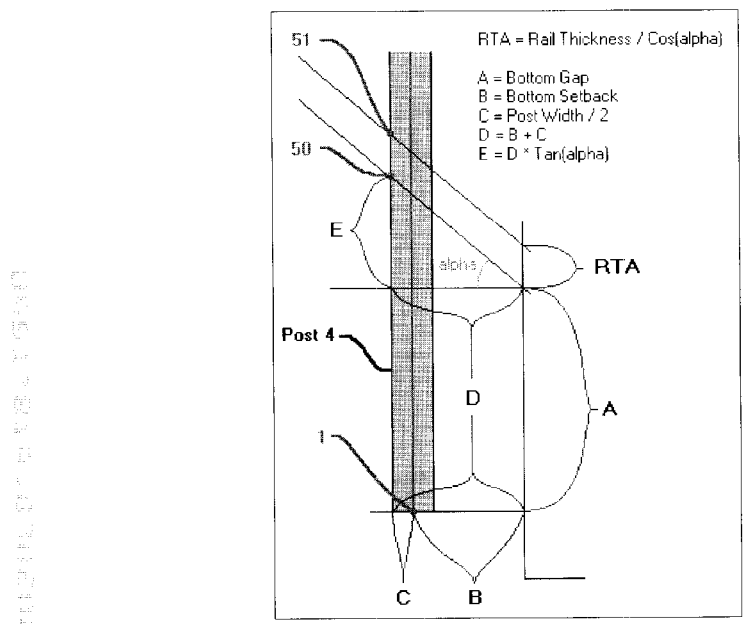

Figure S-300 alpha = Angle (of section 3 Noseline) = 35
RTA = Rail Thickness / Cos(alpha) = 0.5 / Cos(35) = 0.5 / 0.8192 = 0.6104
A = Bottom Gap = 1 11/16 = 1.6875
B = Bottom Setback (of section 3) = 4.0000
C = Post Width / 2 = 1 / 2 = 0.5000
D = B + C = 4.0000 + 0.5000 = 4.5000
E = D * Tan(alpha) = 4.5000 * Tan(35) = 4.5000 * 0.7002 = 3.1509

Calculate the location of point 50:

Point 50 X-coordinate = Point 1 X-coordinate − C = 151.7558 − 0.5000 = 151.2558
Point 50 Y-coordinate = Point 1 Y-coordinate + A + E = 0 + 1.6875 + 3.1509 = 4.8384

So the coordinates of point 50 are (151.2558, 4.8384).

APPENDIX 1

Calculate the location of point 51:

Point 51 X-coordinate = point 50 X-coordinate = 151.2558
Point 51 Y-coordinate = point 50 Y-coordinate + RTA = 4.8384 + 0.6104 = 5.4488

So the coordinates of point 51 are (151.2558, 5.4488).

Points 52 – 55 at top of section 3:

Next we will calculate points 52 – 55 for the bottom rail at the top of section 3, as indicated by the following diagram, figure S-310.

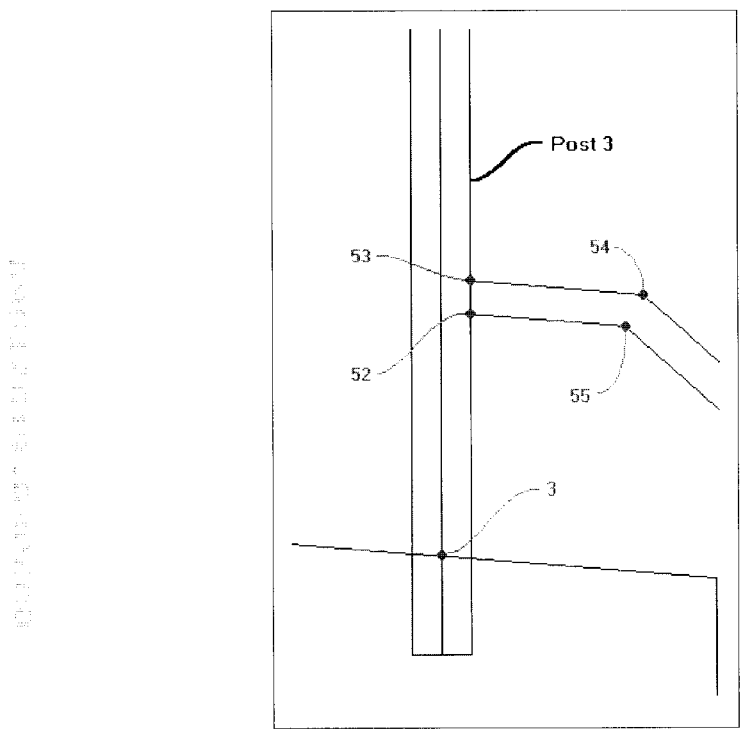

Figure S-310

The points will be calculated using the formulae shown in the following diagram, figure S-320.

APPENDIX 1
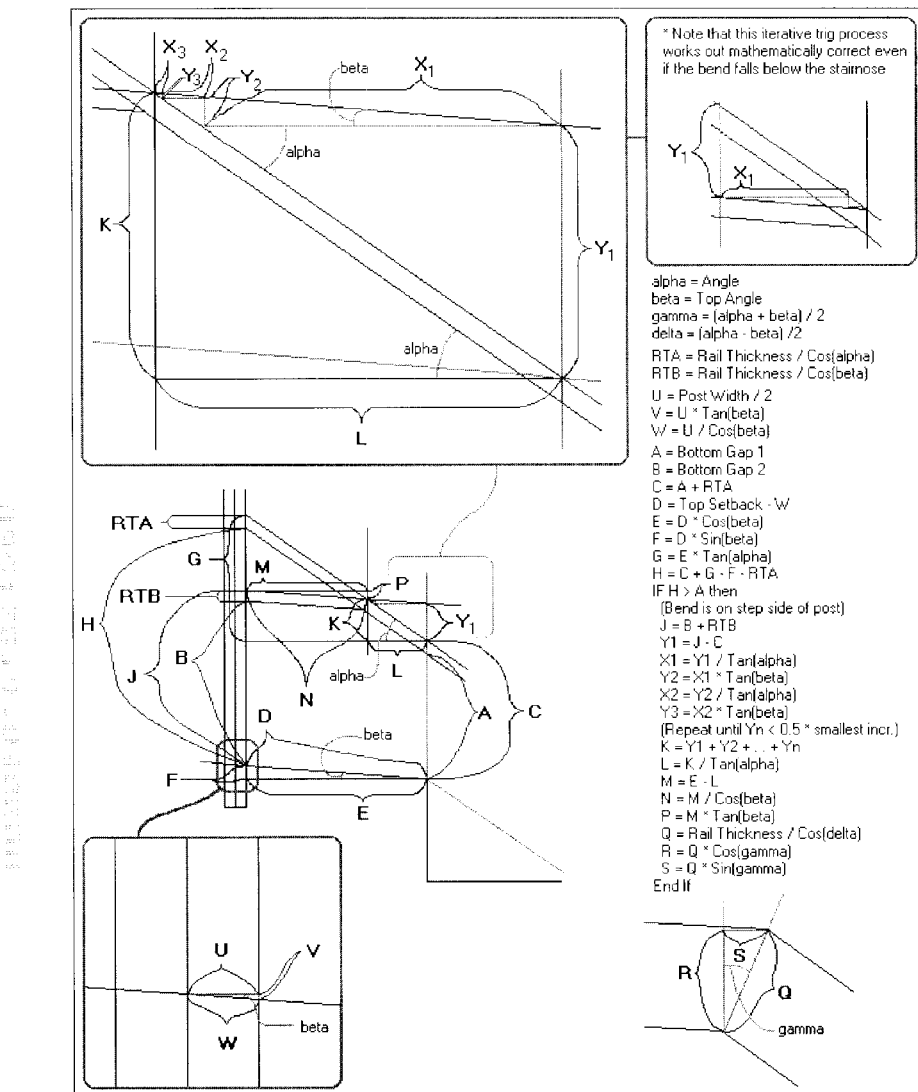
Figure S-320

APPENDIX 1 alpha = angle (of section 3 noseline) = 35
beta = top angle (of section 3) = 2
gamma = (alpha + beta) / 2 = (35 + 2) / 2 = 37 / 2 = 18.5
delta = (alpha − beta) / 2 = (35 − 2) / 2 = 33 / 2 = 16.5
RTA = Rail Thickness / Cos(alpha) = 0.5 / Cos(35) = 0.5 / 0.8192 = 0.6104
RTB = Rail Thickness / Cos(beta) = 0.5 / Cos(2) = 0.5 / 0.9994 = 0.5003
U = Post Width / 2 = 1 / 2 = 0.5000
V = U * Tan(beta) = 0.5000 * Tan(2) = 0.5000 * 0.0349 = 0.0175
W = U / Cos(beta) = 0.5000 / Cos(2) = 0.5000 / 0.9994 = 0.5003
A = Bottom Gap 1 = 1 11/16 = 1.6875
B = Bottom Gap 2 = 3 11/16 = 3.6875
C = A + RTA = 1.6875 + 0.6104 = 2.2979
D = Top Setback (of section 3) − W = 8 − 0.5003 = 7.4997
E = D * Cos(beta) = 3.4997 * Cos(2) = 7.4997 * 0.9994 = 7.4952
F = D * Sin(beta) = 3.4997 * Sin(2) = 7.4997 * 0.0349 = 0.2617
G = E * Tan(alpha) = 7.4952 * Tan(35) = 7.4952 * 0.7002 = 5.2481
H = C + G − F − RTA = 2.2979 + 5.2481 − 0.2617 = 7.2843
H = 7.2843 > 1.6875 = A; so bend exists on step side of post
J = B + RTB = 3.6875 + 0.5003 = 4.1878
Y1 = J − C = 4.1878 − 2.2979 = 1.8899
X1 = Y1 / Tan(alpha) = 1.8899 / Tan(35) = 1.8899 / 0.7002 = 2.6991
Y2 = X1 * Tan(beta) = 2.6991 * Tan(2) = 2.6991 * 0.0349 = 0.0942

(0.0942 > 0.0313; repeat and calculate Y3)

X2 = Y2 / Tan(alpha) = 0.0942 / Tan(35) = 0.0942 / 0.7002 = 0.1345
Y3 = X2 * Tan(beta) = 0.1345 * Tan(2) = 0.1345 * 0.0349 = 0.0047

(0.0047 < 0.0313, so stop there)

K = Y1 + Y2 + ... + Yn = 1.8899 + 0.0942 + 0.0047 = 1.9888
L = K / Tan(alpha) = 1.9888 / Tan(35) = 1.9888 / 0.7002 = 2.8403
M = E − L = 7.4952 − 2.8403 = 4.6549
N = M / Cos(beta) = 4.6549 / Cos(2) = 4.6549 / 0.9994 = 4.6577
P = M * Tan(beta) = 4.6549 * Tan(2) = 4.6549 * 0.0349 = 0.1625
Q = Rail Thickness / Cos(delta) = 0.5 / Cos(16.5) = 0.5 / 0.9588 = 0.5215
R = Q * Cos(gamma) = 0.5215 * Cos(18.5) = 0.5215 * 0.9483 = 0.4946
S = Q * Sin(gamma) = 0.4946 * Sin(18.5) = 0.4946 * 0.3173 = 0.1569

Calculate the location of point 52:

Point 52 is the bottom left corner of the bottom rail, where the bottom rail meets post 3 (see figure S-310).

Point 52 X-coordinate = Point 3 X-coordinate + U = 113.3563 + 0.5000 = 113.8563
Point 52 Y-coordinate = Point 3 Y-coordinate − V + B
 = 24.3694 − 0.0175 + 3.6875 = 28.0394

So the coordinates of point 52 are (113.8563, 28.0394).

APPENDIX 1

Calculate the location of point 53:

Point 53 is the top left corner of the bottom rail, where the bottom rail meets post 3 (see figure S-310).

Point 53 X-coordinate = Point 52 X-coordinate = 113.8563
Point 53 Y-coordinate = Point 52 Y-coordinate + RTB = 28.0394 + 0.5003 = 28.5397

So the coordinates of point 53 are (113.8563, 28.5397).

Lower Transition Offset Calculator

Calculate the location of point 54:

Point 54 is the top of the bend in the bottom rail at the top of section 3 (see figure S-310).

Point 54 X-coordinate = Point 53 X-coordinate + M = 113.8563 + 4.6549 = 118.5112
Point 54 Y-coordinate = Point 53 Y-coordinate − P = 28.5397 − 0.1625 = 28.3772

So the coordinates of point 54 are (118.5112, 28.3772).

Calculate the location of point 55:

Point 54 is the bottom of the bend in the bottom rail at the top of section 3 (see figure S-310).

Point 55 X-coordinate = Point 54 X-coordinate − S = 118.5112 − 0.1569 = 118.3543
Point 55 Y-coordinate = Point 54 Y-coordinate − R = 28.3772 − 0.4946 = 27.8826

So the coordinates of point 55 are (118.3543, 27.8826).

Calculate location of points 56 – 60:

In order to calculate the locations of points 56 – 60, as indicated in figure S-330 below, we must first calculate the transition radius for the bend.

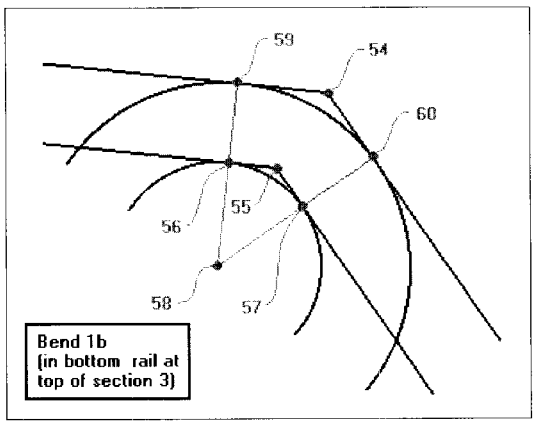

Figure S-330

APPENDIX 1

Calculating the transition radius of curvature for bend #1b:

The process is identical to that which was applied for finding bend #1 in the top rail; the difference is that a different material is used for the bottom rail in this sample, and it has different properties, as indicated below:

- When bent downward at 30 degrees, the radius of curvature (to the bottom of the material) is 2.7"; the mark adjustment is 0.2397".

- When bent downward at 40 degrees, the radius of curvature (to the bottom of the material) is 2.4"; the mark adjustment is –0.2378.

Using data gathered for the same material for which the transition radii were measured (for the bottom rail), the following elasticity ratio has been determined:

Downward Bend Elasticity Ratio: 0.9081

Transition Radius of curvature for downward bend (bend #1b):

Interpolation Ratio = (Max Radius – Min Radius) / (Max Angle – Min Angle)
= (2.4 – 2.7) / (40 – 30) = -0.3 / 10 = -0.03
Radius = Min Radius + ((Angle – Min Angle) * Interpolation Ratio)
= 2.7 + ((33 – 30) * -0.03) = 2.7 + (3 * -0.03) = 2.7 + (-0.09) = 2.61

Calculations for determining points 56 - 60 for bend 1b (see figure S-220):

alpha = 35
beta = 2
gamma = (alpha + beta) / 2 = (35 + 2) / 2 = 37 / 2 = 18.5
delta = (alpha – beta) / 2 = (35 – 2) / 2 = 33 / 2 = 16.5

R = Radius = Transition Radius of curvature for downward bends = 2.61
A = R * Tan(delta) = 2.61 * Tan(16.5) = 3.04 * 0.2962 = 0.7731
B = A * Sin(beta) = 0.9005 * Sin(2) = 0.7731 * 0.0349 = 0.0270
C = A * Cos(beta) = 0.9005 * Cos(2) = 0.7731 * 0.9994 = 0.7726
D = R * Sin(beta) = 2.61 * Sin(2) = 2.61 * 0.0349 = 0.0911
E = C + D = 0.7726 + 0.0911 = 0.8637
F = A * Cos(alpha) = 0.7731 * Cos(35) = 0.7731 * 0.8192 = 0.6333
G = A * Sin(alpha) = 0.7731 * Sin(35) = 0.7731 * 0.5736 = 0.4435
H = E / Tan(gamma) = 0.8637 / Tan(18.5) = 0.8637 / 0.3346 = 2.5813

Calculate the location of point 56 (see figure S-210):

Point 56 X-coordinate = point 55 X-coordinate – C = 118.3543 – 0.7726 = 117.5817
Point 56 Y-coordinate = point 55 Y-coordinate + B = 27.8826 + 0.0270 = 27.9096
So the coordinates of point 56 are (117.5817, 27.9096).

Calculate the location of point 57 (see figure S-210):

Point 57 X-coordinate = point 55 X-coordinate + F = 118.3543 + 0.6333 = 118.9876
Point 57 Y-coordinate = point 55 Y-coordinate – G = 27.8826 – 0.4435 = 27.4391
So the coordinates of point 57 are (118.9876, 27.4391).

APPENDIX 1

Calculate the location of point 58 (see figure S-210):
Point 58 X-coordinate = point 55 X-coordinate – E = 118.3543 – 0.8637 = 117.4906
Point 58 Y-coordinate = point 55 Y-coordinate – H = 27.8826 – 2.5813 = 25.3013
So the coordinates of point 58 are (117.4906, 25.3013).
Since points 59 and 60 are on the convex side of the bend, values A, B, C, F & G must be recalculated using a different Radius; specifically, the former radius plus the thickness of the material. We don't need to calculate a new D-value, E-value or H-value, since they are only used to determine the location of point 58, the center of curvature, which has already been calculated. That is, both the bottom side of the curve (concave side) and the top side (convex side) use the same center of curvature. (See figure S-220.)

R = Radius = Previously used Radius + Rail thickness = 2.61 + 0.5 = 3.11
A = R * Tan(delta) = 3.11 * Tan(16.5) = 3.11 * 0.2962 = 0.9212
B = A * Sin(beta) = 0.9212 * Sin(2) = 0.9212 * 0.0349 = 0.0321
C = A * Cos(beta) = 0.9212 * Cos(2) = 0.9212 * 0.9994 = 0.9206
F = A * Cos(alpha) = 0.9212 * Cos(56) = 0.9212 * 0.8192 = 0.7546
G = A * Sin(alpha) = 0.9212 * Sin(56) = 0.9212 * 0.5736 = 0.5284

Calculate the location of point 59 (see figure S-210):
Point 59 X-coordinate = point 54 X-coordinate – C = 118.5112 – 0.9206 = 117.5906
Point 59 Y-coordinate = point 54 Y-coordinate + B = 28.3772 + 0.0321 = 28.4093
So the coordinates of point 59 are (117.5906, 28.4093).

Calculate the location of point 60 (see figure S-210):
Point 60 X-coordinate = point 54 X-coordinate + F = 118.5112 + 0.7546 = 119.2658
Point 60 Y-coordinate = point 54 Y-coordinate – G = 28.3772 – 0.5284 = 27.8488
So the coordinates of point 60 are (119.2658, 27.8488).

Calculate Bend Mark relative offset distance for Bend 1b (in section 3 bottom rail):
As with the top rail, we determine the location of the bend mark on section 3's piece of bottom rail by calculating its relative distance from the center of the calculated arc of curvature for the bend (we don't actually calculate a point location for the mark). The distance calculated is applied later, when the bottom rail length is calculated, so the location of the mark can be indicated in the appropriate location along the length of the pre-bent bottom rail material.

Bend Mark offset distance for downward bend (bend #1b):

Interpolation Ratio = (Max Distance – Min Distance) / (Max Angle – Min Angle)
= (–0.2378 – (–0.2397)) / (40 – 30) = 0.0019 / 10 = 0.0002
Distance = Min Distance + ((Angle – Min Angle) * Interpolation Ratio)
= –0.2397 + ((33 – 30) * 0.0002) = –0.2397 + (3 * 0.0002)
= –0.2397 + (0.0006) = –0.2391

APPENDIX 1
Calculate length of bottom rail for section 3:
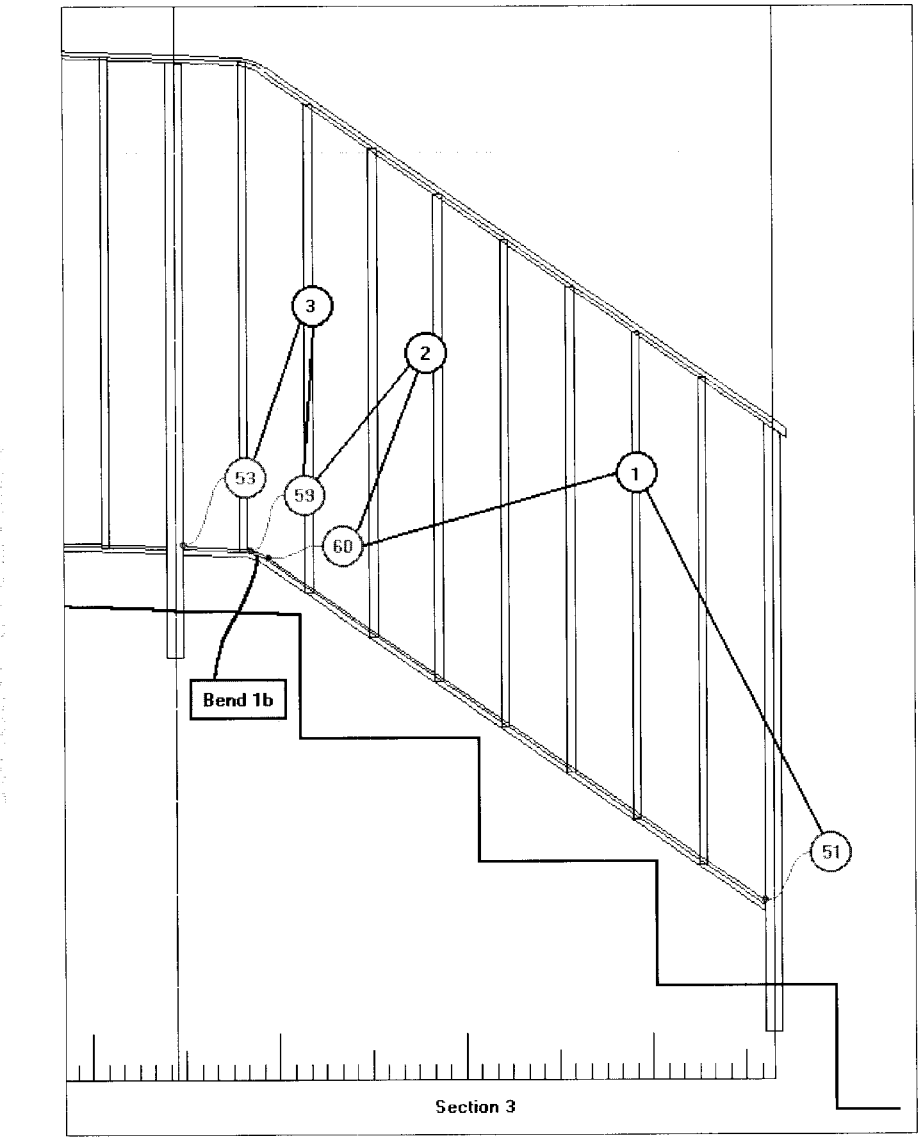
Figure S-340

APPENDIX 1

There are only three portions of bottom rail for which to calculate the length, as indicated in figure S-340. These are then summed to determine the length of the piece, as was done with the top rail.

1. Distance between points 51 and 60:

Distance = Square Root $[(X_{60} - X_{51})^2 + (Y_{60} - Y_{51})^2]$

= Square Root $[(119.2658 - 151.2558)^2 + (27.8488 - 5.4488)^2]$

= Square Root $[(-31.99)^2 + (22.4000)^2]$

= Square Root $[1023.3601 + 501.7600]$

= Square Root $[1525.1201]$

= 39.0528

2. Length for bend 1b:

Transition Radius for downward bends: 2.61
Downward Bend Elasticity Ratio: 0.9081
Material Thickness: 0.5
Degree of bend: 33

Radians = degrees * (Pi/180) = 33 * (3.1416/180) = 0.5760
Calculation Radius = Transition radius + (elasticity ratio * material thickness)
        = 2.61 + (0.9081 * 0.5) = 2.61 + 0.4541 = 3.0641

Length = Radians * Calculation Radius = 0.5760 * 3.0641
    = 1.7649

3. Distance between points 59 and 53:

Distance = Square Root $[(X_{53} - X_{59})^2 + (Y_{53} - Y_{59})^2]$

= Square Root $[(113.8563 - 117.5906)^2 + (28.5397 - 28.4093)^2]$

= Square Root $[(-3.7343)^2 + (0.1304)^2]$

= Square Root $[13.9450 + 0.0170]$

= Square Root $[13.9620]$

= 3.7366

Adding the three lengths gives us the length for the piece of bottom rail in section 3:
Length = Length #1 + Length #2 + Length #3 = 39.0528 + 1.7649 + 3.7366 = 44.5543

APPENDIX 1

Picket Spacer:

We are now ready to determine the horizontal picket spacing for section 3. The first step is to determine the width of the horizontal space between posts 3 and 4. This can be done by subtracting the X-coordinate of the right side of post 3 from the X-coordinate of the left side of post 4. Point 53 (see figure S-340) can supply the X-coordinate for the right side of post 3. Point 51 (see figure S-340) can supply the X-coordinate for the left side of post 4.

Horizontal space = $X_{51} - X_{53}$ = 151.2558 – 113.8563 = 37.3995

The information from the following "General Rail Specifications" is also needed here:

(3.) All pickets are to be ½" thick.
(4.) The maximum spacing between pickets is 3 7/8".
(8.) All calculated values are to be rounded to the nearest $1/16^{th}$ of an inch.

The following diagram, Figure S-400, shows the values used to calculate the picket spacing:

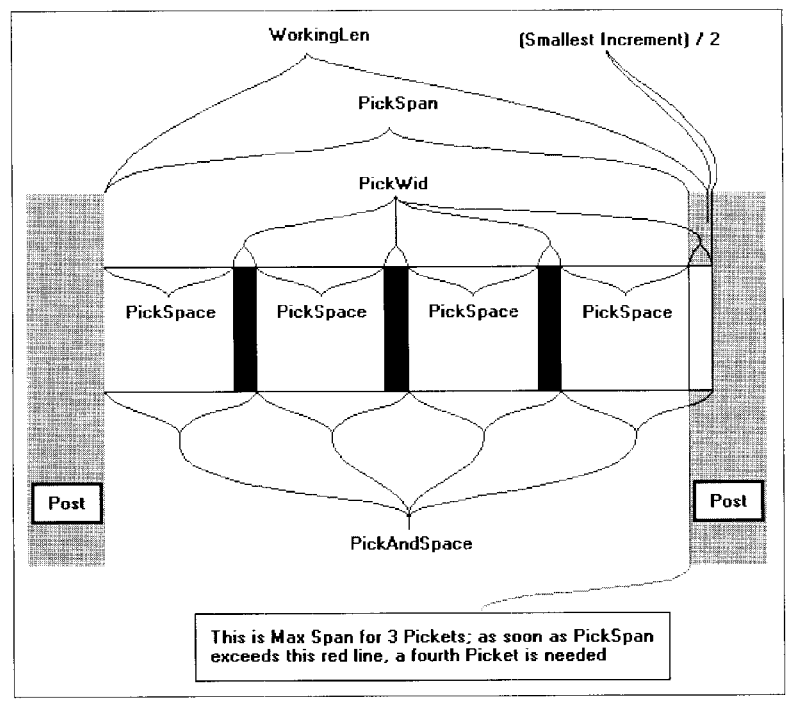

Figure S-400

APPENDIX 1

To determine the number of pickets needed, we first determine the following values:

PickWid = Picket Width = 0.5
PickSpace = Maximum Spacing between pickets = 3 7/8 = 3.8750
PickAndSpace = PickWid + PickSpace = 0.5000 + 3.8750 = 4.3750
PickSpan = Horizontal space to fill (determined above) = 37.3995
WorkingLen = PickSpan + PickWid − (Smallest Increment / 2)
  = 37.3995 + 0.5000 − (0.0313) = 37.8682
NumPickets = Round Down(WorkingLen / PickAndSpace)
  = Round Down(37.8682 / 4.3750) = Round Down(8.6556) = 8

So 8 Pickets are needed. We now must determine the actual spacing to use, so that the spaces are even between all pickets, and between the end pickets and their adjacent posts. To do this we subtract the width that the 8 pickets will cover, then dived the remaining empty space by 9, since there will be 9 spaces.

EvenSpace = (PickSpan − (NumPickets * PickWid)) / (NumPickets + 1)
  = (37.3995 − (8 * 0.5)) / (8 + 1)
  = (37.3995 − 4) / 9 = 33.3995 / 9 = 3.7111

To avoid accumulating round-off errors, since the picket location marks on the rails must be rounded to the nearest $1/16^{th}$ inch, we round the "EvenSpace" value (calculated above) down to the nearest $1/16^{th}$, multiply that value by the number of spaces, then determine the difference between the result and the original amount of space to be filled. The difference value is then divided into sixteenths, and distribute those sixteenths (one apiece) to however many spaces need them. (Mathematically it will always work out that the number of leftover sixteenths will always be less than the number of spaces). The following steps will clarify the procedure just described:

Round decimal portion of EvenSpace to nearest $1/16^{th}$:

0.7111 * 16 = 11.3776

Rounding this value down gives 11; this tells us the space between the pickets should be 3 11/16".

Determine space to be covered due to round-off accumulation:

Space currently covered:
Covered = (3 11/16) * 9 = 3.6875 * 9 = 33.1875

Space leftover to be accounted for:
Leftover = (PickSpan − (NumPickets * PickWid)) − (Space currently covered)
  = 33.3995 − 33.1875
  = 0.212

Number of spaces to which to distribute an extra $1/16^{th}$ inch:
NumExtras = Round(Leftover * 1/(smallest increment)
  = Round(0.212 * 16) = Round(3.392 ) = 3

APPENDIX 1

So the last three spaces will be 1/16$^{th}$ inch larger than the first 6 spaces, or 3 ¾".

Spaces 1 – 6: 3 11/16"
Spaces 7 – 9: 3 ¾"

Determine Picket Location Marks:

First we will use the above calculated values to determine the X-coordinates for the picket marks. Once found, we can then determine the Y-coordinates needed.

Picket #1 X-coordinates:

X-coordinate of left side of picket = X-coordinate of right side of Post 3 + Space #1
$$= X_{S3} + (3\ 11/16) = 113.8563 + 3.6875 = 117.5438$$
X-coordinate for center of picket = $X_{left}$ + (PickWid/2) = 117.5438 + 0.2500 = 117.7938
X-coordinate for right of picket = $X_{center}$ + (PickWid/2) = 117.7938 + 0.2500 = 118.0438

Picket #2 X-coordinates:

X-coordinate of left side of picket = X-coordinate of right side of Picket #1 + Space #2
$$= X1_{right} + (3\ 11/16) = 118.0438 + 3.6875 = 121.7313$$
X-coordinate for center of picket = $X_{left}$ + (PickWid/2) = 121.7313 + 0.2500 = 121.9813
X-coordinate for right of picket = $X_{center}$ + (PickWid/2) = 121.9813 + 0.2500 = 122.2313

Picket #3 X-coordinates:

X-coordinate of left side of picket = X-coordinate of right side of Picket #2 + Space #3
$$= X2_{right} + (3\ 11/16) = 122.2313 + 3.6875 = 125.9188$$
X-coordinate for center of picket = $X_{left}$ + (PickWid/2) = 125.9188 + 0.2500 = 126.1688
X-coordinate for right of picket = $X_{center}$ + (PickWid/2) = 126.1688 + 0.2500 = 126.4188

Picket #4 X-coordinates:

X-coordinate of left side of picket = X-coordinate of right side of Picket #3 + Space #4
$$= X3_{right} + (3\ 11/16) = 126.4188 + 3.6875 = 130.1063$$
X-coordinate for center of picket = $X_{left}$ + (PickWid/2) = 130.1063 + 0.2500 = 130.3563
X-coordinate for right of picket = $X_{center}$ + (PickWid/2) = 130.3563 + 0.2500 = 130.6063

Picket #5 X-coordinates:

X-coordinate of left side of picket = X-coordinate of right side of Picket #4 + Space #5
$$= X4_{right} + (3\ 11/16) = 130.6063 + 3.6875 = 134.2938$$
X-coordinate for center of picket = $X_{left}$ + (PickWid/2) = 134.2938 + 0.2500 = 134.5438
X-coordinate for right of picket = $X_{center}$ + (PickWid/2) = 134.5438 + 0.2500 = 134.7938

Picket #6 X-coordinates:

X-coordinate of left side of picket = X-coordinate of right side of Picket #5 + Space #6
$$= X5_{right} + (3\ 11/16) = 134.7938 + 3.6875 = 138.4813$$
X-coordinate for center of picket = $X_{left}$ + (PickWid/2) = 138.4813 + 0.2500 = 138.7313
X-coordinate for right of picket = $X_{center}$ + (PickWid/2) = 138.7313 + 0.2500 = 138.9813

APPENDIX 1

Picket #7 X-coordinates:

X-coordinate of left side of picket = X-coordinate of right side of Picket #6 + Space #7
$$= X6_{right} + (3\ ¾) = 138.9813 + 3.7500 = 142.7313$$
X-coordinate for center of picket = $X_{left}$ + (PickWid/2) = 142.7313 + 0.2500 = 142.9813
X-coordinate for right of picket = $X_{center}$ + (PickWid/2) = 142.9813 + 0.2500 = 143.2313

Picket #8 X-coordinates:

X-coordinate of left side of picket = X-coordinate of right side of Picket #7 + Space #8
$$= X7_{right} + (3\ ¾) = 143.2313 + 3.7500 = 146.9813$$
X-coordinate for center of picket = $X_{left}$ + (PickWid/2) = 146.9813 + 0.2500 = 147.2313
X-coordinate for right of picket = $X_{center}$ + (PickWid/2) = 147.2313 + 0.2500 = 147.4813

Confirm space 9 is correct:

Notice that the last space is equal to the difference between the X-coordinate of the left side of post 4 and the X-coordinate of the right side of picket #8:

Last space = X51 − (X-coordinate for right of picket 8) = 151.2558 − 147.4813 = 3.7745

Rounded to the nearest $1/16^{th}$ inch, the calculated space is 3 ¾", as indicated above that it should be.

Calculate Y-Values for Pickets:

Because the pickets are level on the top and bottom, the Y-coordinate will be the same for the bottom left, center and right points for each picket; and the top left, center and right Y-coordinates will also be equal to each other. Because the angle of the rail is inclined to the left, it is the right side of the top of the picket that will make contact with the underside of the rail. Also, it is the right side of the bottom picket that must meet the depth requirement specified, since calculating for the left side could possibly allow the right side to remain above the bottom rail.

General Rail Specifications #5 & #6 are pertinent to review here:

5. The pickets are to set into the underside of the top rail to a distance that is 1/4" from the bottom of the material when measured perpendicularly from the bottom of the rail.

6. The pickets are to set into the top of the bottom rail to a distance that is 3/16" from the top of the material when measured perpendicularly from the top of the rail.

First we will calculate the location of the tops of the pickets. To do so, we need to calculate the locations of four new points, points 61 – 64, as indicated in figure S-410 below.

APPENDIX 1
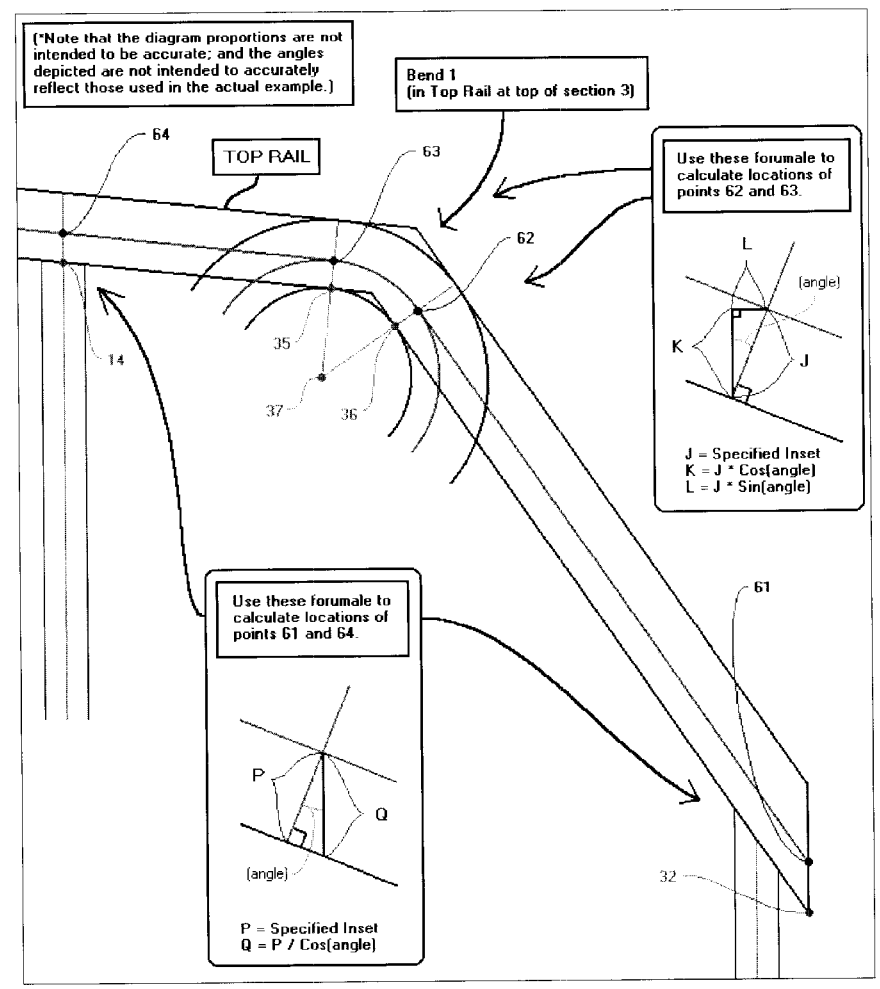
Figure S-410
Once points 61 – 64 have been located, determining the Y-value of a picket top will be handled according to which span the picket's right-side X-coordinate falls into: the span between points 61 and 62, between points 62 and 63, or between points 63 and 64.

APPENDIX 1

Calculate the location of point 61:

Using the formulae indicated for point 61 in figure S-410, we can calculate the location of point 61 relative to point 32.

P = Specified Inset = 0.25 (see general specification #5)
Q = P / Cos(angle of section 3 noseline)
    = 0.2500 / Cos(35) = 0.2500 / 0.8192 = 0.3052

Point 61 X-coordinate = Point 32 X-coordinate = 152.6654
Point 61 Y-coordinate = Point 32 Y-coordinate + Q = 35.5535 + 0.3052 = 35.8587

So the coordinates of point 61 are (152.6654, 35.8587).

Calculate the location of point 64:

(We will calculate points 62 and 63 after this point; we calculate this one now since it uses the same formulae as point 61.)

Using the formulae indicated for point 64 in figure S-410, we can calculate the location of point 64 relative to point 14.

P = Specified Inset = 0.25 (see general specification #5)
Q = P / Cos(angle of section 3 top setback)
    = 0.2500 / Cos(2) = 0.2500 / 0.9994 = 0.2502

Point 64 X-coordinate = Point 14 X-coordinate = 113.3563
Point 64 Y-coordinate = Point 14 Y-coordinate + Q = 59.8691 + 0.2502 = 60.1193

So the coordinates of point 64 are (113.3563, 60.1193).

Calculate the location of point 62:

Using the formulae indicated for point 62 in figure S-410, we can calculate the location of point 62 relative to point 36.

J = Specified Inset = 0.25 (see general specification #5)
K = J * Cos(angle of section 3 noseline)
    = 0.2500 * Cos(35) = 0.2500 * 0.8192 = 0.2048
L = J * Sin(angle of section 3 noseline)
    = 0.2500 * Sin(35) = 0.2500 * 0.5736 = 0.1434

Point 62 X-coordinate = Point 36 X-coordinate + L = 118.9262 + 0.1434 = 119.0696
Point 62 Y-coordinate = Point 36 Y-coordinate + K = 59.1841 + 0.2048 = 59.3889

So the coordinates of point 62 are (119.0696, 59.3889).

APPENDIX 1

Calculate the location of point 63:

Using the formulae indicated for point 62 in figure S-410, we can calculate the location of point 63 relative to point 35.

J = Specified Inset = 0.25 (see general specification #5)
K = J * Cos(angle of section 3 top setback)
  = 0.2500 * Cos(2) = 0.2500 * 0.9994 = 0.2498
L = J * Sin(angle of section 3 top setback)
  = 0.2500 * Sin(2) = 0.2500 * 0.0349 = 0.0087

Point 63 X-coordinate = Point 35 X-coordinate + L = 117.2886 + 0.0087 = 117.2973
Point 63 Y-coordinate = Point 35 Y-coordinate + K = 59.7320 + 0.2498 = 59.9818

So the coordinates of point 63 are (117.2973, 59.9818).

Here are the X-coordinates of points 61 – 64 listed in left to right order:

64-X: 113.3563    63-X: 117.2973    62-X: 119.0696    61-X: 152.6654

Calculate Y-values for top of picket 1:

The X-coordinate for the right side of picket 1 is 118.0438, as calculated previously. This lies horizontally between points 63 and 62, which means that the right side of the picket top is on the curve of bend 1.

Figure S-420 below shows the formulae needed to calculate the location of the top right corner of picket 1.

APPENDIX 1
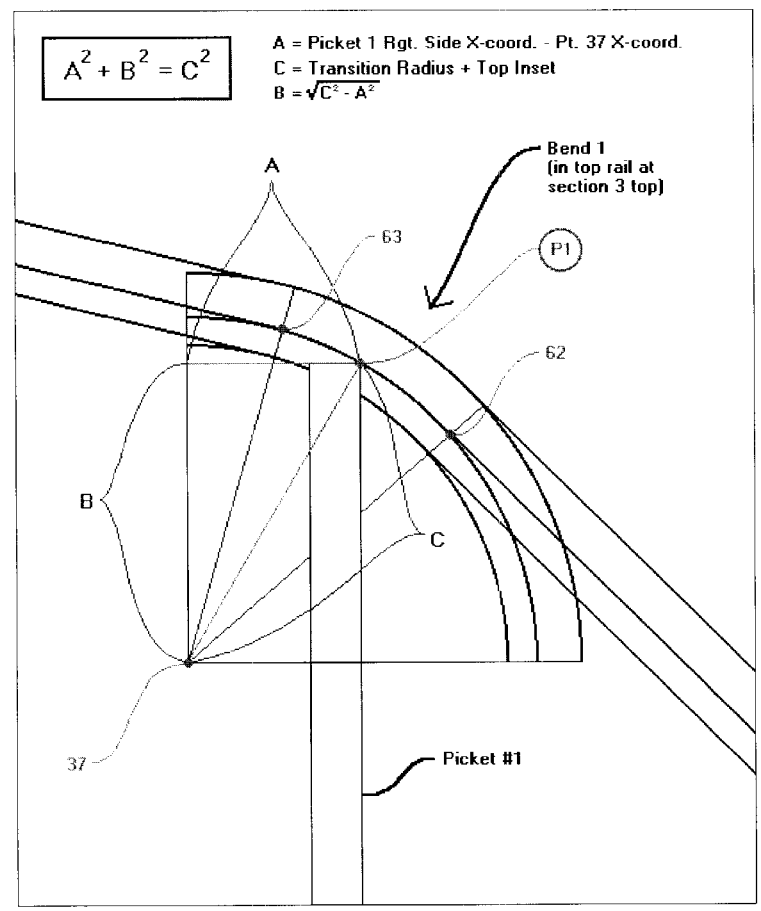
Figure S-420
A = Picket 1 Right Side X-coordinate – Pt. 37 X-coordinate
 = 118.0438 – 117.1825 = 0.8613
C = Transition Radius for Bend 1 + Top Inset
 = 3.04 + 0.25 = 3.29
B = Square Root $[C^2 - A^2]$
 = Square Root $[3.29^2 - 0.8613^2]$
 = Square Root $[10.8241 - 0.7418]$ = Square Root $[10.0823]$ = 3.1753

APPENDIX 1

Calculate the location of point P1:

Point P1 is the top right corner of picket 1.

Point P1 X-coordinate = Picket 1 Right Side X-coordinate = 118.0438
Point P1 Y-coordinate = Point 37 Y-coordinate + B = 56.6937 + 3.1753 = 59.8690

So the coordinates of point P1 are (118.0438, 59.8690).

(Recall also that Picket 1's top center point and top left corner, whose X-values are already calculated, will have the same Y-coordinates as point P1. We won't need these for any further calculations, but they are now available for use to the portion of the system that draws the diagram of the rail.)

Calculate Y-values for top of picket 2:

The X-coordinate for the right side of picket 2 is 122.2313, as calculated previously. This lies horizontally between points 62 and 61, which means that the right side of the picket top is on the straight line between the two points. We can therefore interpolate the Y-value of picket 2, and all remaining pickets in fact, which also must lie in the only remaining portion of the top rail, the span between points 62 and 61. The interpolation formula listed below can be applied to all remaining pickets, therefore. The Y-coordinates apply to all three top points (left, center and right) for each picket; however, it is the RIGHT-SIDE X-coordinate of the picket that is used in the interpolation formula below, where "X-coordinate" is indicated.

Interpolation Formula:

$$Y\text{-coordinate} = Y62 + \{[(Y61 - Y62)/(X61 - X62)] * [X\text{-coordinate} - X62]\}$$
$$= 59.3889 + \{[(35.8587 - 59.3889)/(152.6654 - 119.0696)]$$
$$* [X\text{-coordinate} - 119.0696]\}$$
$$= 59.3889 + \{[(-23.5302)/(33.5958)] * [X\text{-coordinate} - 119.0696]\}$$
$$= 59.3889 + \{[-0.7004] * [X\text{-coordinate} - 119.0696]\}$$

Picket 2 Top Y-coordinate = 59.3889 + {[-0.7004] * [X-coordinate − 119.0696]}
= 59.3889 + {[-0.7004] * [122.2313 − 119.0696]}
= 59.3889 + {[-0.7004] * [3.1617]}
= 59.3889 + {-2.2145}
= 57.1744

Calculate Y-values for top of picket 3:

Picket 3 Top Y-coordinate = 59.3889 + {[-0.7004] * [X-coordinate − 119.0696]}
= 59.3889 + {[-0.7004] * [126.4188 − 119.0696]}
= 59.3889 + {[-0.7004] * [7.3492]}
= 59.3889 + {-5.1474}
= 54.2415

Pickets 4 − 8 have their top Y-coordinates calculated in the exact same manner, using their own X-coordinate values in the interpolation formula. The process has been thoroughly demonstrated for the purposes of this example, so there is no need to repeat the process to calculate the Y-coordinates for the tops of the rest of the pickets.

APPENDIX 1

We will now calculate the Y-coordinates for the bottoms of pickets 1 – 3, so that we can then calculate their heights. To do so, we need to calculate the locations of four new points, points 65 – 68, as indicated in figure S-430 below.

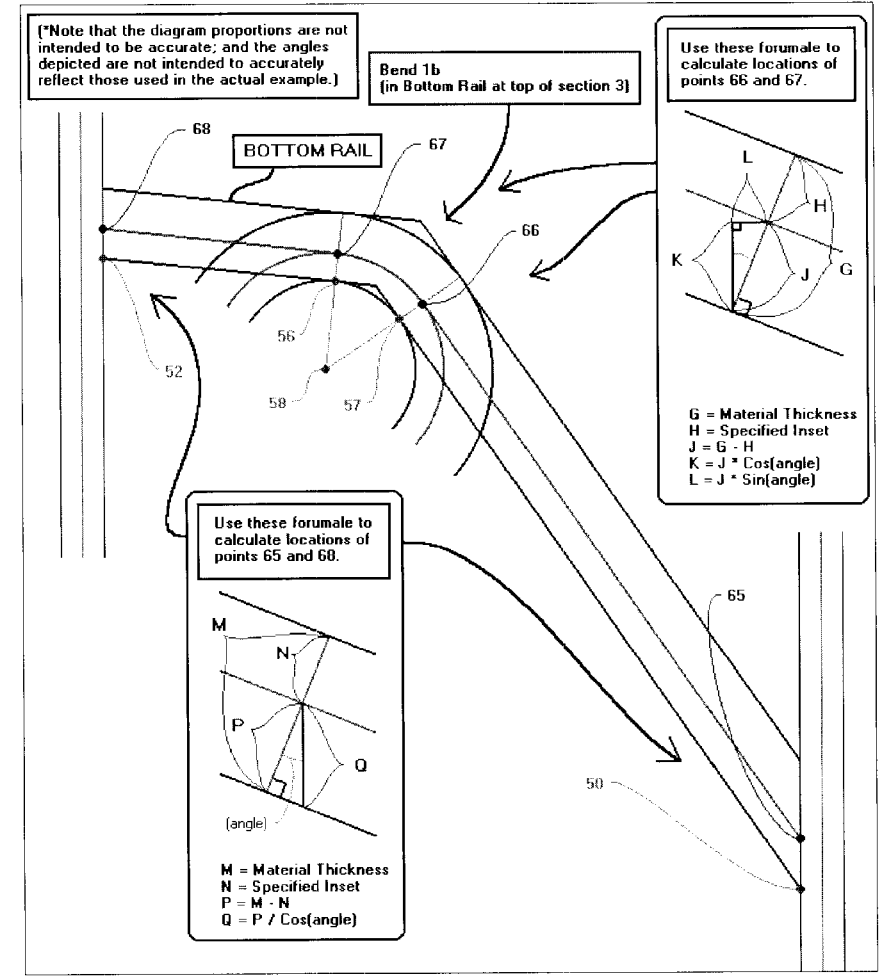

Figure S-430

Once points 65 – 68 have been located, determining the Y-value of a picket bottom will be handled according to which span the picket's right-side X-coordinate falls into: the span between points 65 and 66, between points 66 and 67, or between points 67 and 68.

APPENDIX 1

Calculate the location of point 65:

Using the formulae indicated for point 65 in figure S-430, we can calculate the location of point 65 relative to point 50.

M = Material Thickness = 0.5
N = Specified Inset = 3/16 = 0.1875 (See general specification #6)
P = M − N = 0.5 − 0.1875 = 0.3125
Q = P / Cos(angle of section 3 noseline)
 = 0.3125 / Cos(35) = 0.3125 / 0.8192 = 0.3815

Point 65 X-coordinate = Point 50 X-coordinate = 151.2558
Point 65 Y-coordinate = Point 50 Y-coordinate + Q = 4.8384 + 0.3815 = 5.2199

So the coordinates of point 65 are (151.2558, 5.2199).

Calculate the location of point 68:

(We will calculate points 66 and 67 after this point; we calculate this one now since it uses the same formulae as point 65.)

Using the formulae indicated for point 68 in figure S-430, we can calculate the location of point 68 relative to point 52.

M = Material Thickness = 0.5
N = Specified Inset = 3/16 = 0.1875 (See general specification #6)
P = M − N = 0.5 − 0.1875 = 0.3125
Q = P / Cos(angle of section 3 top setback)
 = 0.3125 / Cos(2) = 0.3125 / 0.9994 = 0.3127

Point 68 X-coordinate = Point 52 X-coordinate = 113.8563
Point 68 Y-coordinate = Point 52 Y-coordinate + Q = 28.0394 + 0.3127 = 28.3521

So the coordinates of point 68 are (113.8563, 28.3521).

Calculate the location of point 66:

Using the formulae indicated for point 66 in figure S-430, we can calculate the location of point 66 relative to point 57.

G = Material Thickness = 0.5
H = Specified Inset = 3/16 = 0.1875 (See general specification #6)
J = G − H = 0.5 − 0.1875 = 0.3125
K = J * Cos(angle of section 3 noseline)
 = 0.3125 * Cos(35) = 0.3125 * 0.8192 = 0.2560
L = J * Sin(angle of section 3 noseline)
 = 0.3125 * Sin(35) = 0.3125 * 0.5736 = 0.1793

Point 66 X-coordinate = Point 57 X-coordinate + L = 118.9876 + 0.1793 = 119.1669
Point 66 Y-coordinate = Point 57 Y-coordinate + K = 27.4391 + 0.2560 = 27.6951

So the coordinates of point 66 are (119.1669, 27.6951).

APPENDIX 1

Calculate the location of point 67:

Using the formulae indicated for point 66 in figure S-430, we can calculate the location of point 67 relative to point 56.

G = Material Thickness = 0.5
H = Specified Inset = 3/16 = 0.1875 (See general specification #6)
J = G − H = 0.5 − 0.1875 = 0.3125
K = J * Cos(angle of section 3 top setback)
   = 0.3125 * Cos(2) = 0.3125 * 0.9994 = 0.3123
L = J * Sin(angle of section 3 top setback)
   = 0.3125 * Sin(2) = 0.3125 * 0.0349 = 0.0109

Point 67 X-coordinate = Point 56 X-coordinate + L = 117.5817 + 0.0109 = 117.5926
Point 67 Y-coordinate = Point 56 Y-coordinate + K = 27.9096 + 0.3123 = 28.2219

So the coordinates of point 67 are (117.5926, 28.2219).

Here are the X-coordinates of points 65 − 68 listed in left to right order:

68-X: 113.8563     67-X: 117.5926     66-X: 119.1669     65-X: 151.2558

Calculate Y-values for bottom of picket 1:

The X-coordinate for the right side of picket 1 is 118.0438, as calculated previously. This lies horizontally between points 67 and 66, which means that the right side of the picket bottom is on the curve of bend 1b.

Figure S-440 below shows the formulae needed to calculate the location of the bottom right corner of picket 1.

63

APPENDIX 1
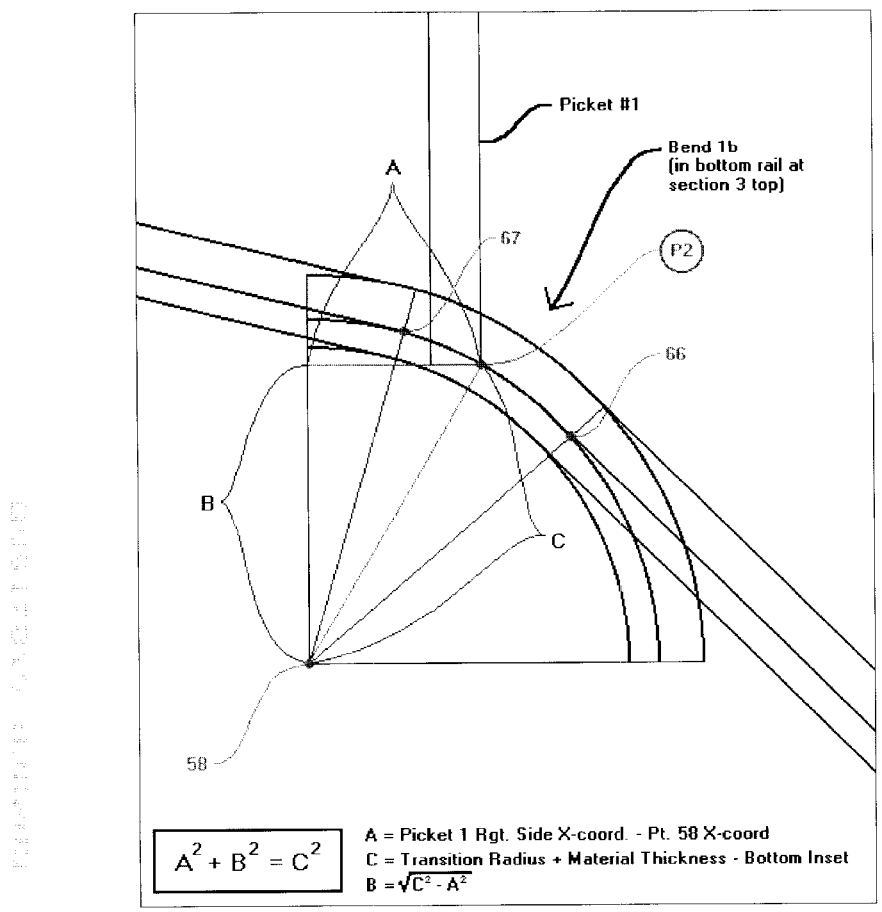
Figure S-440
A = Picket 1 Right Side X-coordinate − Pt. 58 X-coordinate
= 118.0438 − 117.4906 = 0.5532
C = Transition Radius for Bend 1b + Material Thickness − Bottom Inset
= 2.61 + 0.5000 − 0.1875 = 2.9225
B = Square Root $[C^2 - A^2]$
= Square Root $[2.9225^2 - 0.5532^2]$
= Square Root [8.5410 − 0.3060] = Square Root [8.2350] = 2.8697

APPENDIX 1

Calculate the location of point P2:

Point P2 is the bottom right corner of picket 1.

Point P2 X-coordinate = Picket 1 Right Side X-coordinate = 118.0438
Point P2 Y-coordinate = Point 58 Y-coordinate + B = 25.3013 + 2.8697 = 28.1710

So the coordinates of point P2 are (118.0438, 28.1710).

(Recall also that Picket 1's bottom center point and bottom left corner, whose X-values are already calculated, will have the same Y-coordinates as point P2. We won't need these for any further calculations, but they are now available for use to the portion of the system that draws the diagram of the rail.)

Calculate Y-values for bottom of picket 2:

The X-coordinate for the right side of picket 2 is 122.2313, as calculated previously. This lies horizontally between points 66 and 65, which means that the right side of the picket bottom is on the straight line between the two points. We can therefore interpolate the Y-value of picket 2, and all remaining pickets in fact, which also must lie in the only remaining portion of the bottom rail, the span between points 66 and 65. The interpolation formula listed below can be applied to all remaining pickets, therefore. The Y-coordinates apply to all three bottom points (left, center and right) for each picket; however, it is the RIGHT-SIDE X-coordinate of the picket that is used in the interpolation formula below, where "X-coordinate" is indicated.

Interpolation Formula:

Y-coordinate = $Y_{66}$ + {[($Y_{65}$ – $Y_{66}$)/($X_{65}$ – $X_{66}$)] * [X-coordinate – $X_{66}$]}
= 27.6951 + {[(5.2199 – 27.6951)/(151.2558 – 119.1669)]
 * [X-coordinate – 119.1669]}
= 27.6951 + {[(-22.4752)/(32.0889)] * [X-coordinate – 119.1669]}
= 27.6951 + {[-0.7004] * [X-coordinate – 119.1669]}

Picket 2 Bottom Y-coordinate = 27.6951 + {[-0.7004] * [X-coordinate – 119.1669]}
= 27.6951 + {[-0.7004] * [122.2313 – 119.1669]}
= 27.6951 + {[-0.7004] * [3.0644]}
= 27.6951 + {-2.1463}
= 25.5487

Calculate Y-values for top of picket 3:

Picket 3 Top Y-coordinate = 27.6951 + {[-0.7004] * [X-coordinate – 119.1669]}
= 27.6951 + {[-0.7004] * [126.4188 – 119.1669]}
= 27.6951 + {[-0.7004] * [7.2519]}
= 27.6951 + {-5.0792}
= 22.6159

Pickets 4 – 8 have their bottom Y-coordinates calculated in the exact same manner, using their own X-coordinate values in the interpolation formula. The process has been thoroughly demonstrated for the purposes of this example, so there is no need to repeat the process to calculate the Y-coordinates for the bottoms of the rest of the pickets.

APPENDIX 1

Calculate Picket Heights

We have now determined the following Y-coordinates for the tops and bottoms of pickets 1 – 3 (the first three pickets from the left in section 3):

Picket 1 Top Y-coordinate: 59.8690
Picket 2 Top Y-coordinate: 57.1744
Picket 3 Top Y-coordinate: 54.2415

Picket 1 Bottom Y-coordinate: 28.1710
Picket 2 Bottom Y-coordinate: 25.5487
Picket 3 Bottom Y-coordinate: 22.6159

The height of each picket is calculated by subtracting the bottom Y-coordinate from the top Y-coordinate:

Picket 1 Height = Picket 1 Top Y-coordinate – Picket 1 Bottom Y-coordinate
= 59.8690 – 28.1710 = 31.698

Picket 2 Height = Picket 2 Top Y-coordinate – Picket 2 Bottom Y-coordinate
= 57.1744 – 25.5487 = 31.6257

Picket 3 Height = Picket 3 Top Y-coordinate – Picket 3 Bottom Y-coordinate
= 54.2415 – 22.6159 = 31.6256

Rounding to the nearest $1/16^{th}$ inch gives the following values:

Picket 1 Height = 31 11/16
Picket 2 Height = 31 5/8
Picket 3 Height = 31 5/8

All three values are within +/– ¼" of 31 ¾", so all would be considered standard pickets, per general specification #9.

APPENDIX 1

Post Height Calculator

The post heights can be calculated similarly to the picket height calculation, since we know the point locations of the post top points and bottom points. General specification 10 indicates that the posts are to be set 3" deep into the step or landing, so we can add this amount to the amount calculated by subtracting the lower Y-coordinates from the upper ones, as follows.

Since the angle inclines to the left, the highest point on each post will be the top-left corner; so we will use that point's Y-coordinate for the upper value. The drill depth of 3: will be considered to be relative to the center of the post, so we will use the Y-coordinate center-point of the post where it intersects the step or landing for the lower value.

Y-Top = Post 1 top left corner = Point 28: Y-coordinate = 93.2339
Y-Bottom = Post 1 bottom intersection center-point = Point 8: Y-coordinate = 57.7167
Intermediary Height = Y-Top – Y-Bottom = 93.2339 – 57.7167 = 35.5172

Post 1 Total Height = Intermediary Height + Drill Depth = 35.5172 + 3.0000 = 38.5172

Y-Top = Post 2 top left corner = Point 22: Y-coordinate = 61.9457
Y-Bottom = Post 2 bottom intersection center-point = Point 4: Y-coordinate = 26.4285
Intermediary Height = Y-Top – Y-Bottom = 61.9457 – 26.4285 = 35.5172

Post 2 Total Height = Intermediary Height + Drill Depth = 35.5172 + 3.0000 = 38.5172

Y-Top = Post 3 top left corner = Point 16: Y-coordinate = 59.8866
Y-Bottom = Post 3 bottom intersection center-point = Point 3: Y-coordinate = 24.3694
Intermediary Height = Y-Top – Y-Bottom = 59.8866 – 24.3694 = 35.5172

Post 3 Total Height = Intermediary Height + Drill Depth = 35.5172 + 3.0000 = 38.5172

Y-Top = Post 4 top left corner = Point 12: Y-coordinate = 36.5405
Y-Bottom = Post 4 bottom intersection center-point = Point 1: Y-coordinate = 0.0000
Intermediary Height = Y-Top – Y-Bottom = 36.5405 – 0.0000 = 36.5405

Post 4 Total Height = Intermediary Height + Drill Depth = 36.5405 + 3.0000 = 39.5405

Rounding to the nearest $1/16^{th}$ inch gives the following results:

Post 1 Total Height = 38 ½"
Post 2 Total Height = 38 ½"
Post 3 Total Height = 38 ½"
Post 4 Total Height = 39 9/16

APPENDIX 1

Dot-Line Generator

A "Dot-Line" is calculated for each section for use in confirming proper setup at rail assembly time. The value is measured from the top-left inside corner to the bottom-right inside corner for each section. Since we have calculated the bottom rail point locations for section 3, we will demonstrate the Dot-line calculation for section 3.

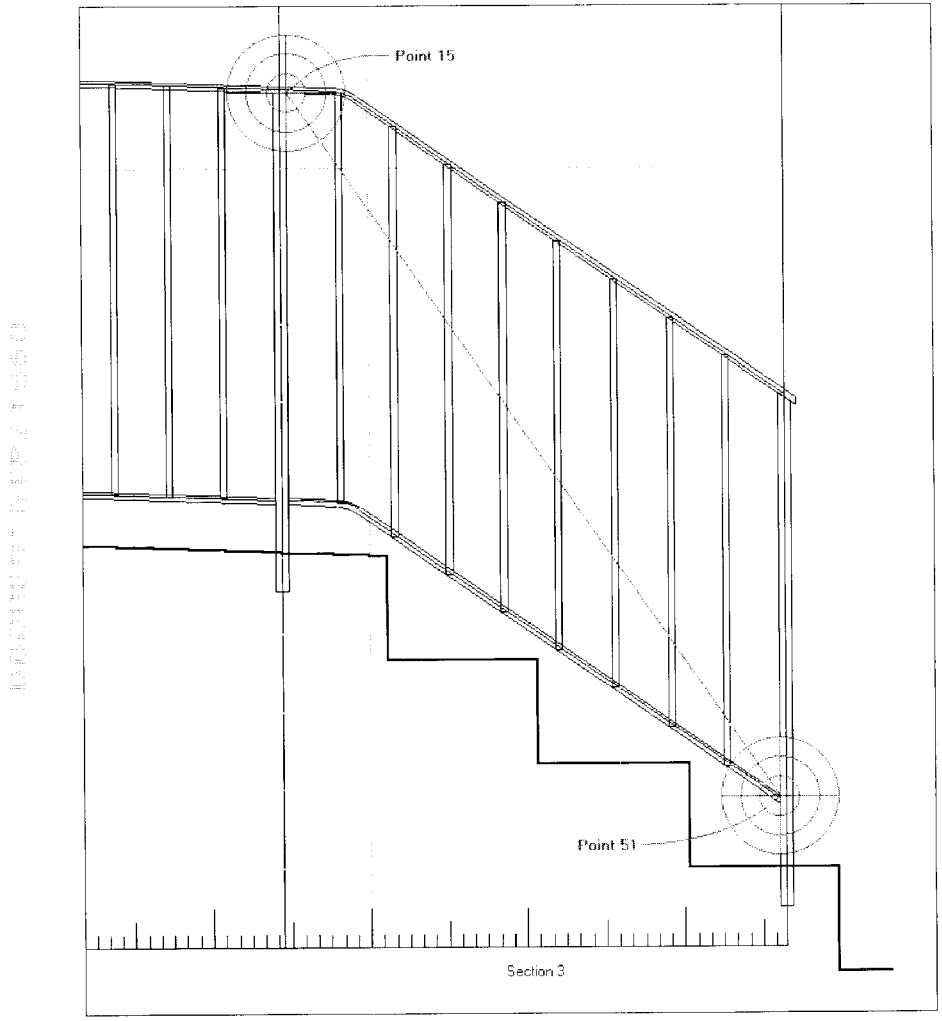

Figure S-500

APPENDIX 1

The "top-left inside corner" for section 3 is point 15 (the top right corner of post #3). The "bottom-right inside corner" for section 3 is point 51 (the top right corner of the bottom rail in section 3). These points are indicated in figure S-500 above.

The calculation of the dot-line is found by using the standard algebraic distance formula between the two points.

Distance = Square Root $[(X_{15} - X_{51})^2 + (Y_{15} - Y_{51})^2]$

= Square Root $[(113.8563 - 151.2558)^2 + (59.8516 - 5.4488)^2]$

= Square Root $[(-37.3995)^2 + (54.4028)^2]$

= Square Root $[1398.7226 + 2959.6646]$

= Square Root $[4358.3872]$

= 66.0181

This value rounded to the nearest $1/16^{th}$ inch is 66".

What is claimed is:

1. An automated multisection rail material list generation system comprising:
   a data importer for receiving dimensional data concerning each section of a multisection rail having a top rail and a bottom rail;
   a rail calculator, responsive to said data importer receiving said dimensional data, for determining the dimensions of the physical rail elements required to produce each section of said multisection rail, wherein said rail calculator includes a transition manager for allowing the user to define a transition radius at any transition point between adjacent rail sections; and
   a material list generator, responsive to said rail calculator, for producing a material list itemizing said physical rail elements and their dimensions required to produce each section of said multisection rail.

2. The automated multisection rail material list generation system of claim 1 wherein said dimensional data describes a multisection rail in which each section of said multisection rail is at a different angle in relation to the horizon.

3. The automated multisection rail material list generation system of claim 1 wherein said material list generator includes a data exporter for providing said material list, which includes said physical rail elements, to an automated cutting station for producing a plurality of dimensioned components.

4. The automated multisection rail material list generation system of claim 3 wherein said data exporter provides said material list, which elements, to an automated assembly station for assembling said plurality of dimensioned components into said multisection rail.

5. The automated multisection rail material list generation system of claim 3 wherein said data exporter includes a graphical interpreter for producing a graphical diagram showing said physical rail elements arranged to form said multisection rail.

6. The automated multisection rail material list generation system of claim 1 wherein said transition manager includes a material elasticity compensator for compensating for any change in length of any said rail bent around said transition radius.

7. The automated multisection rail material list generation system of claim 1 wherein said rail calculator includes an upper transition offset calculator for determining the offset of an upper transition point between each said top rail of each said rail section in relation to the point of contact between said sections.

8. The automated multisection rail material list generation system of claim 1 wherein said rail calculator includes a lower transition offset calculator for determining the offset of a lower transition point between each said bottom rail of each said rail section in relation to the point of contact between said sections.

9. The automated multisection rail material list generation system of claim 1 wherein said dimensional data describes a multisection rail that includes at least one post and said rail calculator includes a post height calculator to determine the required height for a post in relation to post offset.

10. The automated multisection rail material list generation system of claim 9 wherein said rail calculator includes a post height calculator to determine the required height for a post in relation to post offset and specific design criteria.

11. The automated multisection rail material list generation system of claim 9 wherein said dimensional data describes a multisection rail in which each said section of said multisection rail includes a plurality of pickets.

12. The automated multisection rail material list generation system of claim 11 wherein said rail calculator includes a picket spacer for analyzing the distance between adjacent posts to determine the required spacing between each of said plurality of pickets in response to specific design criteria.

13. The automated multisection rail material list generation system of claim 1 wherein said rail calculator includes a dot line generator for calculating a linear measurement between any two points on said multisection rail.

14. An automated multisection rail material list generation system comprising:
   a data importer for receiving dimensional data concerning each section of a multisection rail;
   a rail calculator, responsive to said data importer receiving said dimensional data, for determining the dimensions of the physical rail elements required to produce each section of said multisection rail; and
   a material list generator, responsive to said rail calculator, for producing a material list itemizing said physical rail elements required to produce said multisection rail;
   wherein said dimensional data describes a multisection rail in which each section of said multisection rail includes a top rail and a bottom rail and said rail calculator includes a transition manager;
   said rail calculator including an upper transition offset calculator, responsive to said transition manager, for determining the offset of an upper transition point between each said top rail of each said section in relation to the point of contact between said sections.

15. A method for generating a material list for a multisection rail comprising the steps of:
   receiving dimensional data concerning each section of a multisection rail;
   determining the dimensions of the physical rail elements required to produce each section of the multisection rail;
   determining the offset of a transition point between adjacent rails of each rail section in relation to the point of contact between the rail sections; and
   producing a material list itemizing the physical rail elements and their dimensions required to produce each section of the multisection rail.

16. The method for generating a material list of claim 15 wherein said transition point is an upper transition point between the top rail of each rail section in relation to the point of contact between the rail sections.

17. The method for generating a material list of claim 15 wherein said transition point is a lower transition point between the bottom rail of each rail section in relation to the point of contact between the rail sections.

18. The method for generating a material list of claim 15 including the step of calculating the required post height in relation to the post offset.

19. The method for generating a material list of claim 15 including the step of analyzing the distance between adjacent posts to determine the required spacing between each picket utilized in each section of the multisection rail.

20. The method for generating a material list of claim 15 including the step of calculating a linear measurement between any two points on the multisection rail.

21. A computer readable medium having a plurality of instructions stored therein which, when executed by a computer, cause that processor to perform the steps of:
   receiving dimensional data concerning a multisection rail having a top rail and a bottom rail;

determining the dimensions of the physical rail elements required to produce the multisection rail;

allowing the user to define a transition radius at any transition point between adjacent rail sections; and producing a material list itemizing the physical rail elements required to produce the multisection rail.

22. The computer readable medium of claim 21 wherein the computer readable medium is a hard drive.

23. The computer readable medium of claim 21 wherein the computer readable medium is a read-only memory.

24. The computer readable medium of claim 21 wherein the computer readable medium is a random access memory.

25. An automated multisection rail material list generation system comprising:

a data importer for receiving dimensional data concerning each section of a multisection rail having a top rail and a bottom rail;

a rail calculator, responsive to said data importer receiving said dimensional data, for determining the dimensions of the physical rail elements required to produce each section of said multisection rail, wherein said rail calculator includes an upper transition offset calculator for determining the offset of an upper transition point between each said top rail of each said rail section in relation to the point of contact between said sections; and a material list generator, responsive to said rail calculator, for producing a material list itemizing said physical rail elements and their dimensions required to produce each section of said multisection rail.

26. An automated multisection rail material list generation system comprising:

a data importer for receiving dimensional data concerning each section of a multisection rail having a top rail and a bottom rail;

a rail calculator, responsive to said data importer receiving said dimensional data, for determining the dimensions of the physical rail elements required to produce each section of said multisection rail, wherein said rail calculator includes a lower transition offset calculator for determining the offset of a lower transition point between each said bottom rail of each said rail section in relation to the point of contact between said sections; and a material list generator, responsive to said rail calculator, for producing a material list itemizing said physical rail elements and their dimensions required to produce each section of said multisection rail.

27. An automated multisection rail material list generation system comprising:

a data importer for receiving dimensional data concerning each section of a multisection rail having a top rail and a bottom rail;

a rail calculator, responsive to said data importer receiving said dimensional data, for determining the dimensions of the physical rail elements required to produce each section of said multisection rail, wherein said rail calculator includes a transition offset calculator for determining the offset of a transition point between adjacent rails of each said rail section in relation to the point of contact between said sections; and a material list generator, responsive to said rail calculator, for producing a material list itemizing said physical rail elements and their dimensions required to produce each section of said multisection rail.

28. An automated multisection rail material list generation system comprising:

a data importer for receiving dimensional data concerning each section of a multisection rail;

a rail calculator, responsive to said data importer receiving said dimensional data, for determining the dimensions of the physical rail elements required to produce each section of said multisection rail; and a material list generator, responsive to said rail calculator, for producing a material list itemizing said physical rail elements required to produce said multisection rail;

wherein said dimensional data describes a multisection rail in which each section of said multisection rail includes a top rail and a bottom rail and said rail calculator includes a transition manager;

wherein said rail calculator includes a lower transition offset calculator, responsive to said transition manager, for determining the offset of a lower transition point between each said bottom rail of each said section in relation to the point of contact between said sections.

29. A computer readable medium having a plurality of instructions stored thereon which, when executed by a computer, cause a processor to perform the steps of:

receiving dimensional data concerning a multisection rail having a top rail and a bottom rail;

determining the dimensions of the physical rail elements required to produce the multisection rail; determining the offset of a transition point between adjacent rails of each rail section in relation to the point of contact between the rail sections; and producing a material list itemizing the physical rail elements required to produce the multisection rail.

30. An automated multisection rail material list generation system comprising:

a data importer for receiving dimensional data concerning each section of a multisection rail;

a rail calculator, responsive to said data importer receiving said dimensional data, for determining the dimensions of the physical rail elements required to produce each section of said multisection rail, wherein said rail calculator includes a transition offset calculator for determining the offset of a transition point between adjacent rails of each said rail section in relation to the point of contact between said sections; and a material list generator, responsive to said rail calculator, for producing a material list itemizing said physical rail elements and their dimensions required to produce each section of said multisection rail.

* * * * *